United States Patent [19]
Ishikawa

[11] Patent Number: 5,539,622
[45] Date of Patent: Jul. 23, 1996

[54] STROBE DEVICE

[75] Inventor: Tuyoshi Ishikawa, Tokyo, Japan

[73] Assignee: Asahi Kogaku Kogyo Kabushiki Kaisha, Tokyo, Japan

[21] Appl. No.: 30,879

[22] Filed: Mar. 12, 1993

[30] Foreign Application Priority Data

| Mar. 12, 1992 | [JP] | Japan | 4-053344 |
| Apr. 6, 1992 | [JP] | Japan | 4-083910 |
| Jun. 18, 1992 | [JP] | Japan | 4-159243 |
| Aug. 10, 1992 | [JP] | Japan | 4-212764 |
| Aug. 28, 1992 | [JP] | Japan | 4-230212 |
| Sep. 14, 1992 | [JP] | Japan | 4-245105 |
| Feb. 18, 1993 | [JP] | Japan | 5-028778 |

[51] Int. Cl.⁶ ............................. F21V 7/09; G03B 15/02
[52] U.S. Cl. .............. 362/16; 362/18; 362/297; 362/299; 362/301; 362/349
[58] Field of Search ................. 362/16, 17, 18, 362/297, 298, 299, 300, 277, 301, 346, 349, 282

[56] References Cited

U.S. PATENT DOCUMENTS

| 2,032,622 | 3/1936 | Guillou | 362/349 |
| 3,484,597 | 12/1969 | Schmidt | 362/16 |
| 4,200,902 | 4/1980 | Intrator | 362/301 |
| 4,295,186 | 10/1981 | Sugiura et al. | 364/301 |
| 4,342,071 | 7/1982 | Chamberlain | 362/310 |
| 4,821,053 | 4/1989 | Dowe et al. | 362/18 |
| 4,847,647 | 7/1989 | Ueda . | |
| 4,914,461 | 4/1990 | Hori . | |
| 4,916,475 | 4/1990 | Hori . | |
| 4,951,074 | 8/1990 | Ueda . | |
| 5,023,764 | 6/1991 | McKinnon et al. | 362/301 |
| 5,055,976 | 10/1991 | Arai . | |
| 5,160,192 | 11/1992 | Sugawara . | |
| 5,195,814 | 3/1993 | Hasushita et al. . | |
| 5,217,299 | 6/1993 | Yoshida et al. . | |

FOREIGN PATENT DOCUMENTS

| 1-246531 | 10/1989 | Japan . |
| 3-48835 | 3/1991 | Japan . |

Primary Examiner—Ira S. Lazarus
Assistant Examiner—Y. Quach
Attorney, Agent, or Firm—Sandler, Greenblum & Bernstein

[57] ABSTRACT

A strobe device is provided, including a light source and a reflector which reflects part of the light emitted from the light source. The reflector is provided with a reflecting surface that is shaped to form virtual images of the light source behind the reflecting surface.

8 Claims, 35 Drawing Sheets

STROBE DEVICE

BACKGROUND OF THE INVENTION

1. Field of the Invention

The present invention relates to a strobe device in which light emitted from a light source is partly reflected, by a reflecting mirror, so that resultant rays of light including the reflected light and direct light from the light source can be emitted from the strobe device.

2. Description of Related Art

A known strobe device has a reflector which is provided behind a light source to reflect a part of light emitted from the light source, so that the reflected light can be emitted together with the direct light from the light source from the strobe device towards an object to be photographed. In the conventional strobe device, the reflector is usually made of an elliptical reflecting mirror. The light source is usually located at one (first focus) of the focus points of the elliptical reflecting mirror. Consequently, for example, a light flux which directly reaches a Fresnel lens (condenser lens) provided in front of the reflecting mirror, without being reflected by the elliptical reflecting mirror, is converged by the Fresnel lens (condenser lens), so that the illumination angle is reduced.

On the other hand, a light flux emitted from the light source and reflected by the reflecting mirror essentially has an elliptical cross section, and accordingly, tends to be converged onto a second focus which is located closer to the light source than the theoretical second focus of the elliptical reflecting mirror by the Fresnel lens. However, if the image of the direct light and the image of the reflected light reflected from the reflecting mirror are formed at different positions, there might be a serious image distortion between the two images relative to the aberration of the Fresnel lens. Consequently, an irregular quantity of light occurs at points of an image, particularly at the center of the image.

SUMMARY OF THE INVENTION

The primary object of the present invention is to eliminate the above-mentioned drawbacks by providing a strobe device having an improved distribution property, wherein irregular quantities of light are not produced by the strobe device.

Another object of the present invention is to provide a strobe device having a reflector to which a light source can be easily attached, and which can be easily and precisely machined and attached to a strobe body within a small mounting space.

Another object of the present invention is to provide a strobe device in which an optimum luminance distribution can be obtained at an illumination surface spaced from the strobe device.

Still another object of the present invention is to provide a small and inexpensive strobe device in which an increased light condensation efficiency can be consistently obtained in a telephoto position and a wide-angle position.

Yet another object of the present invention is to provide a small and simple strobe device in which no decrease in emission efficiency occurs, even at a telephoto position in which a condenser lens is moved away from a reflecting mirror, so that the guide number (GN) can be increased.

According to the present invention, there is provided a strobe device comprising a light source and a reflector which reflects light emitted from the light source, wherein the reflector comprises a reflecting surface which is shaped to form virtual images of the light source behind the reflecting surface.

According to another aspect of the present invention, there is provided a strobe device comprising a light source and a reflecting mirror which reflects light emitted from the light source, wherein the reflecting mirror comprises an arch-shaped first reflecting surface, substantially concentric to a circle whose center is located at a light emitting point of the light source, and second reflecting surface surfaces which are smoothly connected to the first reflecting surface.

According to still another aspect of the present invention, there is provided a strobe reflecting mirror for reflecting light emitted from a light source of a strobe, wherein the reflecting mirror comprises an arch-shaped first reflecting surface, substantially concentric to a circle whose center is located at a light emitting point of the light source, and second reflecting surfaces which are smoothly connected to the first reflecting surface.

According to still another aspect of the present invention, there is provided a strobe device comprising a linear light source and a reflecting mirror which reflects light emitted from the light source and includes a pair of substantially planar reflecting surfaces, which are symmetrically located on opposite sides of a median plane including an optical axis of the strobe device and a longitudinal axis of the linear light source. The strobe device can be accommodated with various reflecting mirrors having reflecting portions, corresponding ends of which have a variety of distances from the median plane, to thereby achieve various illumination angles of the strobe device.

According to still another aspect of the present invention, there is provided a strobe device comprising a light source, a pair of reflecting plates provided on opposite sides of the light source, reflecting plate supports which permit rotation of ends of the reflecting plates remote from the light source, and a device for rotating the reflecting plates at the ends thereof supported by the reflecting plate supports to move the other ends of the reflecting plates towards and away from the light source to vary the angle defined by and between the reflecting plates.

According to still another aspect of the present invention, a strobe device comprises a light source, a positive lens which is located in front of the light source to have a fixed relative position with respect to the light source and which has a positive power, at least in one direction, a negative lens which is located in front of the positive lens and which has a negative power, at least in the same directions as the positive lens, and a device for varying the distance between the positive lens and the negative lens to vary the illumination angle of the strobe device.

According to still another aspect of the present invention, a strobe device having a variable illumination angle for use in a camera having a zoom lens, comprises a light source, a reflecting mirror for reflecting light emitted from the light source, and a lens member which is movable to and from a position in front of the reflecting mirror in accordance with a change in the focal length of the zoom lens to thereby vary the illumination angle.

According to still another aspect of the present invention, there is provided a strobe device comprising a light source, a pair of curved reflecting plates, supports which permit rotation of the reflecting plates about the ends thereof remote from the light source, and a device for rotating the reflecting plates about the ends thereof remote from the light source, so as to move the other ends of the reflecting plates towards and away from the light source to thereby vary the illumination angle of reflected light defined by the reflecting plates.

The present disclosure relates to subject matter contained in Japanese Patent Applications Nos. 4-83910 (filed on Apr. 6, 1992), 4-53344 (filed on Mar. 12, 1992), 4-159243 (filed on Jun. 18, 1992), 4-212764 (filed on Aug. 10, 1992), 4-230212 (filed on Aug. 28, 1992), 4-245105 (filed on Sep. 14, 1992), and 5-28778 (filed on Feb. 18, 1993), which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENT

The inventors of the present invention have found that a uniform distribution of light can be retained as long as light transmitted through a Fresnel lens is not converged to form an image. Namely, according to one concept of the present invention, light is converged not after, but before it is transmitted through the Fresnel lens. To this end, in the present invention, a virtual image, rather than a real image, of a light source is formed by a reflecting mirror to realize a uniform distribution.

Figure 1:
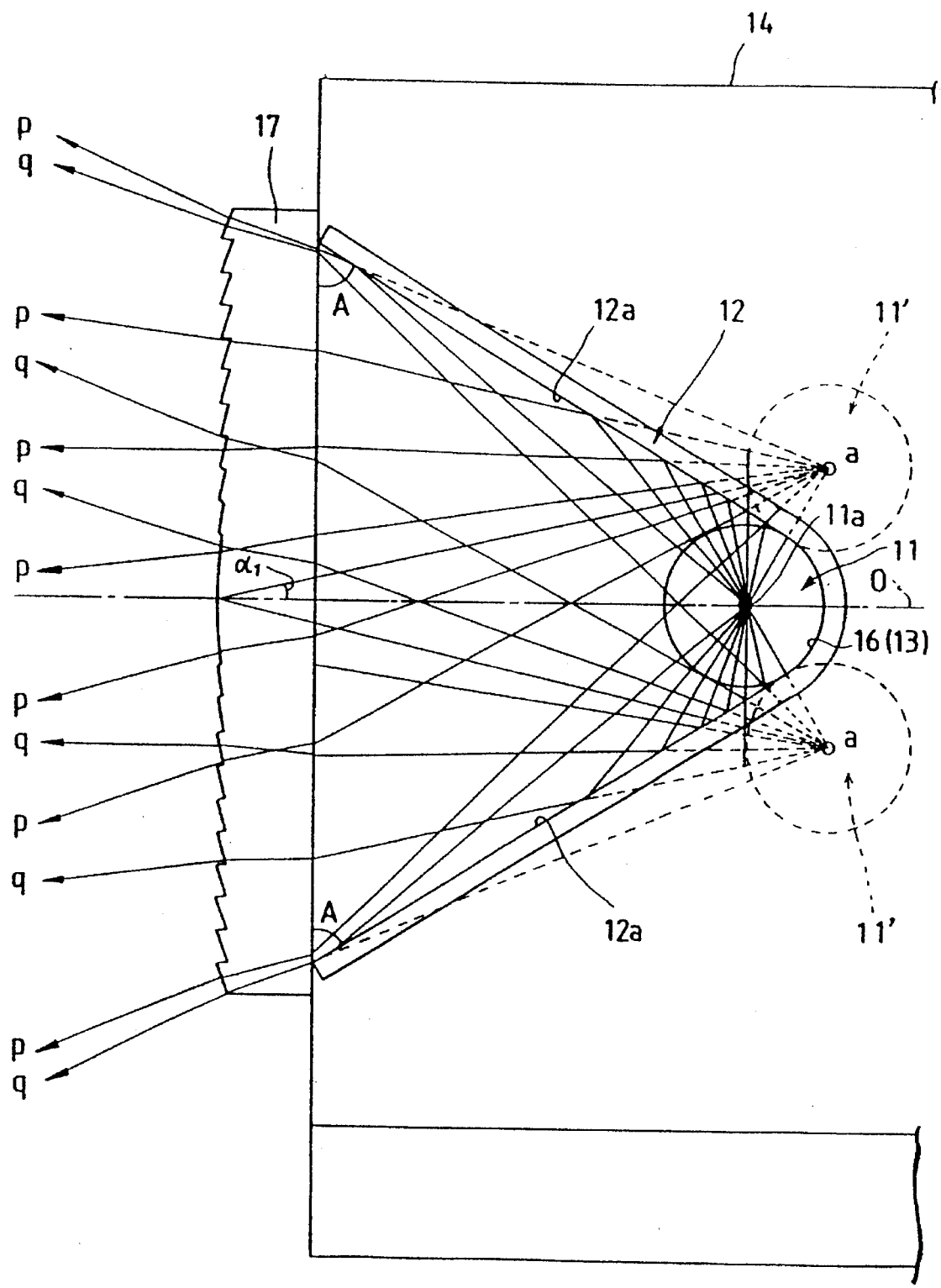
FIG. 1 is a sectional view of a strobe device, according to a first embodiment of the present invention, along an optical axis of illumination light.

FIG. 1, which shows a first embodiment of the present invention, is a sectional view along the optical axis O of illumination light passing through an axis of a light emitting tube (light source) 11, such as a xenon tube. In FIG. 1, a reflecting mirror 12 has a first reflecting surface 13 located behind the light emitting tube 11 and pair of upper and lower second reflecting surfaces 12a connected to the first reflecting surface 13. The plate-like second reflecting surfaces 12a are located in a symmetrical arrangement with respect to the optical axis O of the light emitting tube 11. Numeral 14 designates a support, such as a strobe body or a camera body, which holds the reflecting mirror 12.

The light emitting tube 11 which is cylindrical is received in a partially cylindrical recess 16 formed on the reflecting mirror 12 at the portion behind the light emitting tube 11 on the optical axis, so that the longitudinal axis of the light emitting tube 11 extends in a direction perpendicular to the optical axis O. The curvature of the recess 16 is the same as the outer peripheral surface of the light emitting tube 11, so that the latter comes into close contact with the recess 16. Namely, the recess 16 defines the arched (circular) first reflecting surface 13 defined by a circle whose center is located on the center 11a of the light emitting tube 11 and whose radius is the same as that of the light emitting tube 11. The first reflecting surface 13 can form a real image of the light emitting tube at the center thereof.

The second light reflecting surfaces 12a are generally in the shape of a flat plate and lie in respective planes tangent to a circle defined by the outer peripheral surface of the light emitting tube 11. In the first embodiment illustrated in FIG. 1, the circle is coincident with the first reflecting surface 13. It is possible to make the second reflecting surfaces 12a, which are straight (planar) in the illustrated embodiment, slightly curved and having a curvature which is considerably smaller than that of reflecting surfaces of a conventional elliptical reflecting mirror. Namely, the second reflecting surfaces can have a variety of shapes, provided that a real image of the light source 11 is not formed by the second reflecting surfaces 12a.

The front ends of the second reflecting surfaces 12a abut against upper and lower ends of a Fresnel lens 17 attached to the front surface of the support 14 at an angle A (e.g., A=60°), respectively.

In the strobe device as constructed above, according to the present invention, a light distribution property can be improved. Furthermore, since the second reflecting surfaces 12a are straight, or substantially straight, it is possible to easily and precisely attach the second reflecting surfaces 12a to the support 14 (e.g., strobe body, or camera body) by which the reflecting mirror 12 is to be supported. Moreover, since the second reflecting surfaces are smoothly connected to the first reflecting surface around the light emitting tube, the reflecting mirror has no sudden change in curvature, so that the direction of the reflected light is predictable. In particular, the reflecting mirror having the straight or substantially straight second reflecting surfaces 12a can be more compact than the conventional elliptical reflecting mirror. In addition to the foregoing, since the shape of the reflecting mirror is determined by the straight or substantially straight second reflecting surfaces 12a and the inclination angle thereof, the quality of the reflecting mirror can be easily checked or examined.

In the reflecting mirror 12, rays of light that are emitted from the light source 11 at the light emitting point 11a are partly reflected by the upper second reflecting surface 12a, as indicated at "p". Similarly, the rays of light that are emitted from the light source 11 at the light emitting point 11a are partly reflected by the lower second reflecting surface 12a, as indicated at "q".

It is deemed that there are equivalently two virtual images of the light emitting point 11a of the light emitting tube 11 at upper and lower points "a" which are optically conjugate with the light emitting point 11a with respect to the respective upper and lower second reflecting surfaces 12a. Namely, rays of light are emitted from the strobe device as if there were light emitting tubes 11' having light emitting points located on the points "a". No formation of images of the rays of light "p" and "q" takes place after they are transmitted through the Fresnel lens 17. Namely, the rays of light "p" and "q" are oriented substantially in the same direction. Accordingly, there is substantially no irregularity in quantity of emitted light, particularly at the center of the bundle of light.

The bundle of light emitted outward from the Fresnel lens 17 includes light (i.e., direct light) directly emitted in the forward direction (left direction in FIG. 1) from the light emitting tube 11 without being reflected by the second reflecting surfaces 12a, and also light (reflected light) reflected from the upper and lower second reflecting surfaces 12a. In addition, light emitted in the opposite direction (right direction in FIG. 1) from the light emitting tube 11 is reflected by the first reflecting surface 13 and is emitted outward (forward) from the Fresnel lens 17 together with the direct light and the reflected light.

Figure 2:
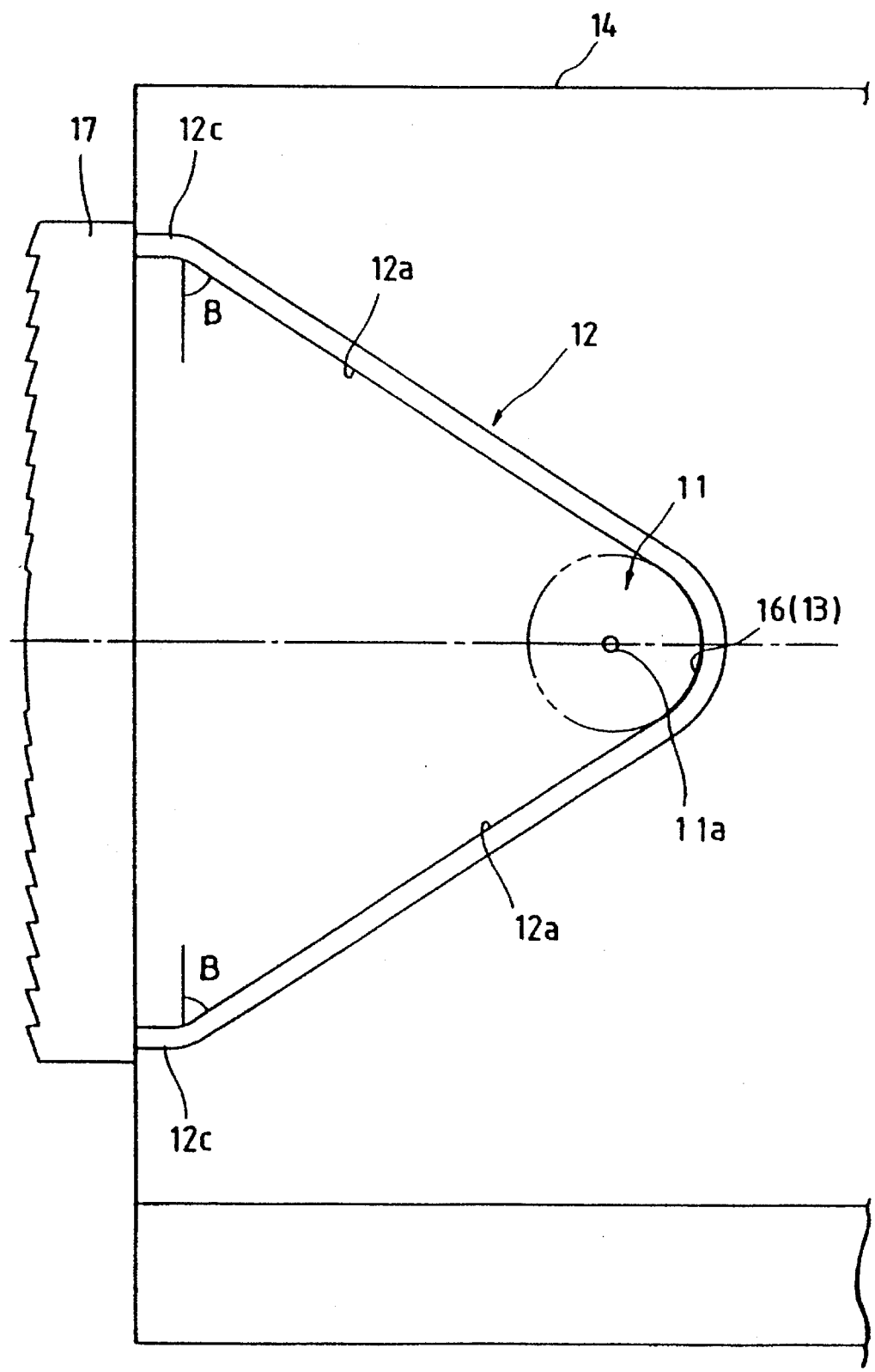
FIG. 2 is a sectional view of a strobe device, according to a second embodiment of the present invention, along an optical axis of illumination light.

FIG. 2 shows a second embodiment of a strobe device according to the present invention, in which the reflecting mirror 12 of FIG. 1 is slightly modified.

The reflecting mirror 12 has connecting front ends 12c which are connected to the rear wall of the Fresnel lens 17 at substantially right angles. The second reflecting surfaces 12a are connected to the connecting ends 12c at a predetermined angle B (e.g.,B=57°). It is apparent that the reflecting mirror 12 shown in FIG. 2 achieves the same technical effects including a uniform light distribution as those of the first embodiment.

Figure 3:
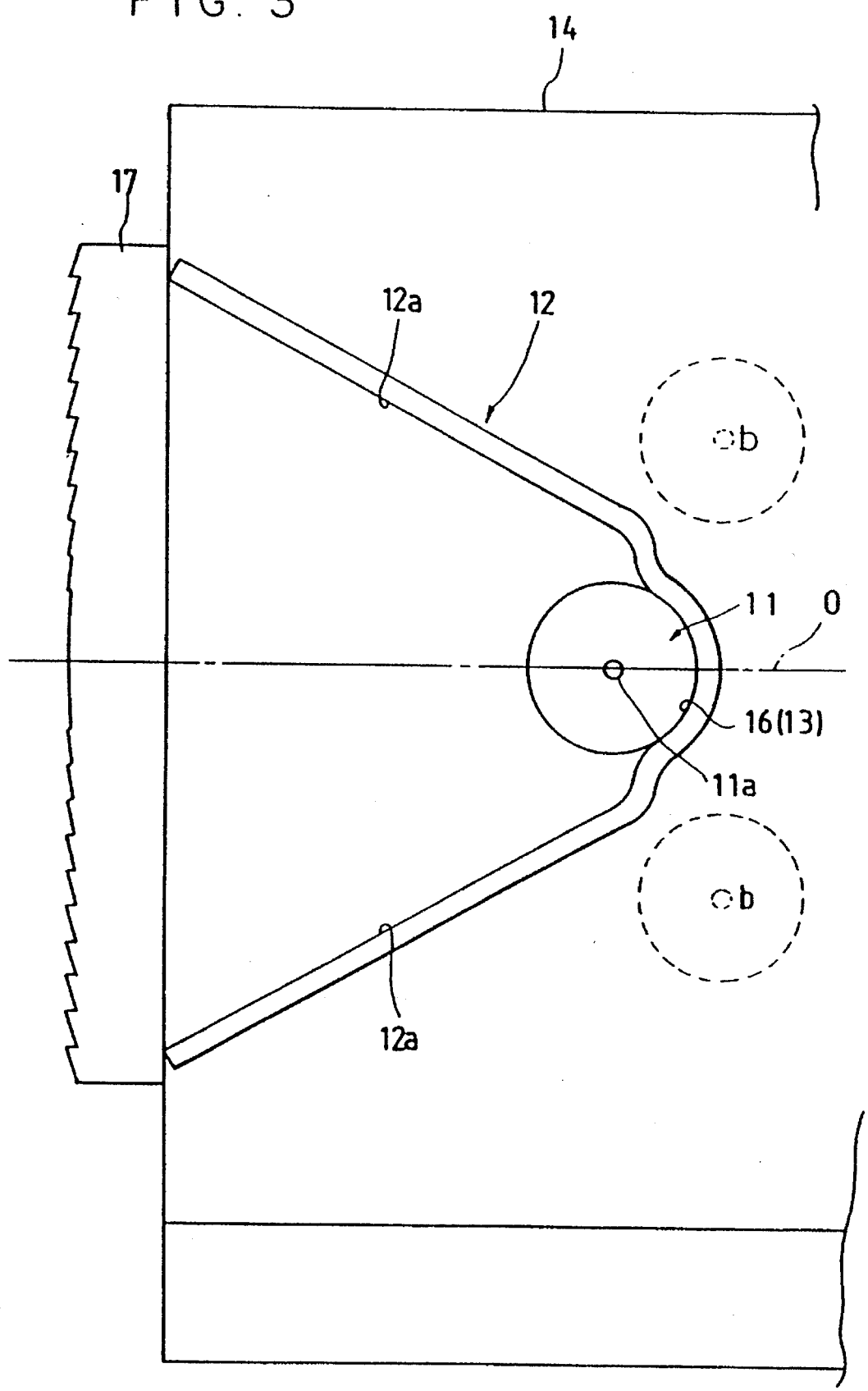
FIG. 3 is a sectional view of a strobe device, according to a third embodiment of the present invention, along an optical axis of illumination light.

FIG. 3 shows a third embodiment of the present invention, in which the reflecting mirror 12 has a first reflecting surface 13 whose shape is slightly different from the first reflecting surface 13 of the reflecting mirror 12 shown in FIG. 1. In the arrangement illustrated in FIG. 3, it is assumed that the distance between the light emitting tube 11 and the Fresnel lens 17 is too small for sufficient surface contact to be achieved between the reflecting surface 13 and the light emitting tube 11, as in the arrangement illustrated in FIG. 1. The connections between the recess 16 (first reflecting surface 13) and the second reflecting surfaces 12a are bent so that the light emitting tube 11 can be snugly received in the recess 16 (first reflecting surface 13). Also, in the third embodiment shown in FIG. 3, the inclination angle of the second reflecting surfaces 12 with respect to the first reflecting surface 13 can be optionally determined by appropriately designing the shape of the bent connections to control the position at which the virtual image is formed to thereby obtain a desired distribution of light.

The above discussion has been directed to conceptual arrangements of the three embodiments illustrated in FIGS. 1 through 3. The reflecting mirror 12 will be more concretely discussed below with reference to FIGS. 4 and 5. The arrangements of the strobe devices shown in FIGS. 4 and 5 are identical except for the lens incorporated therein.

Figure 4:
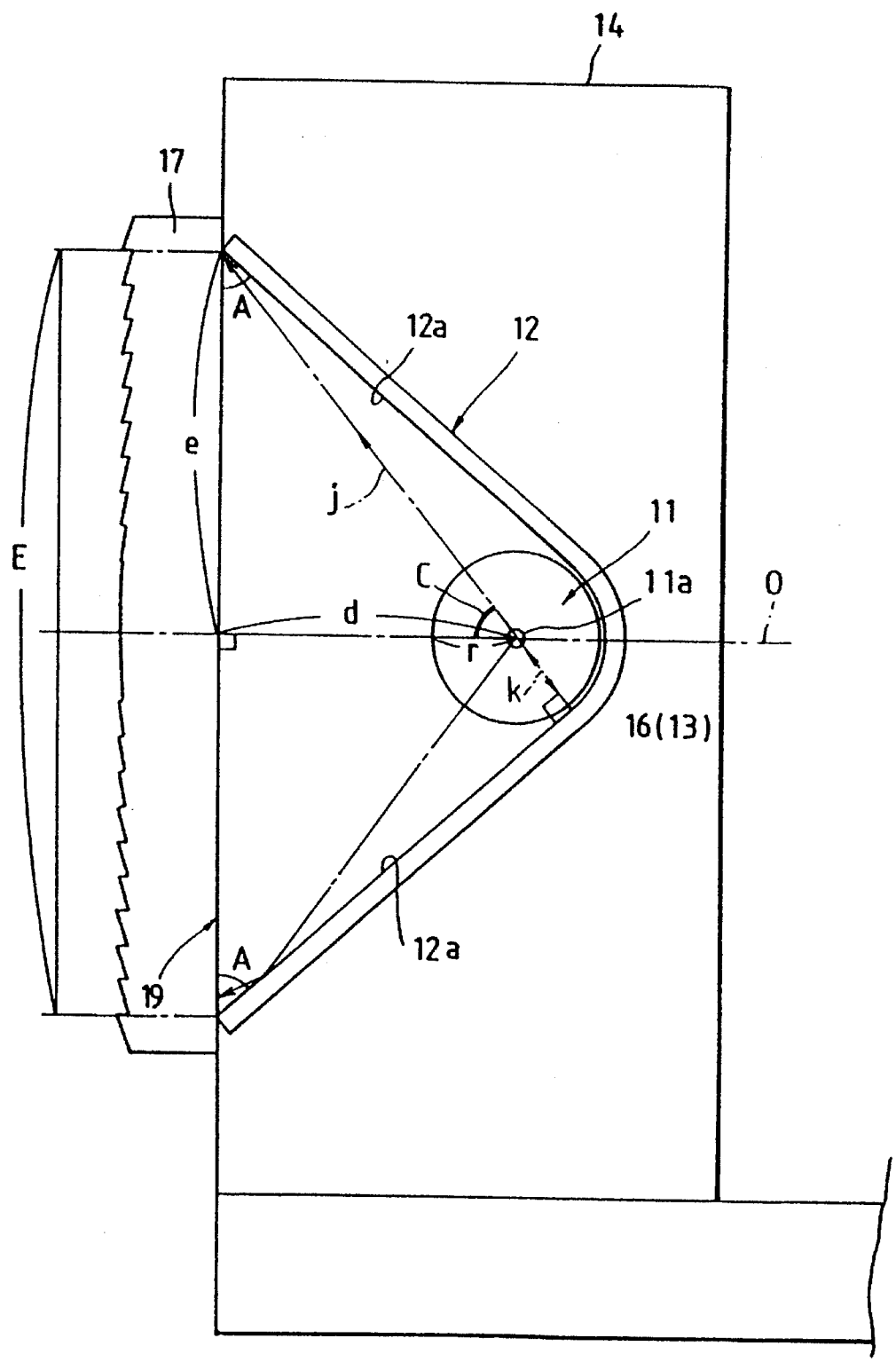
FIG. 4 is a sectional view showing a more detailed structure of a strobe device, according to the present invention, along an optical axis of illumination light.
Figure 5:
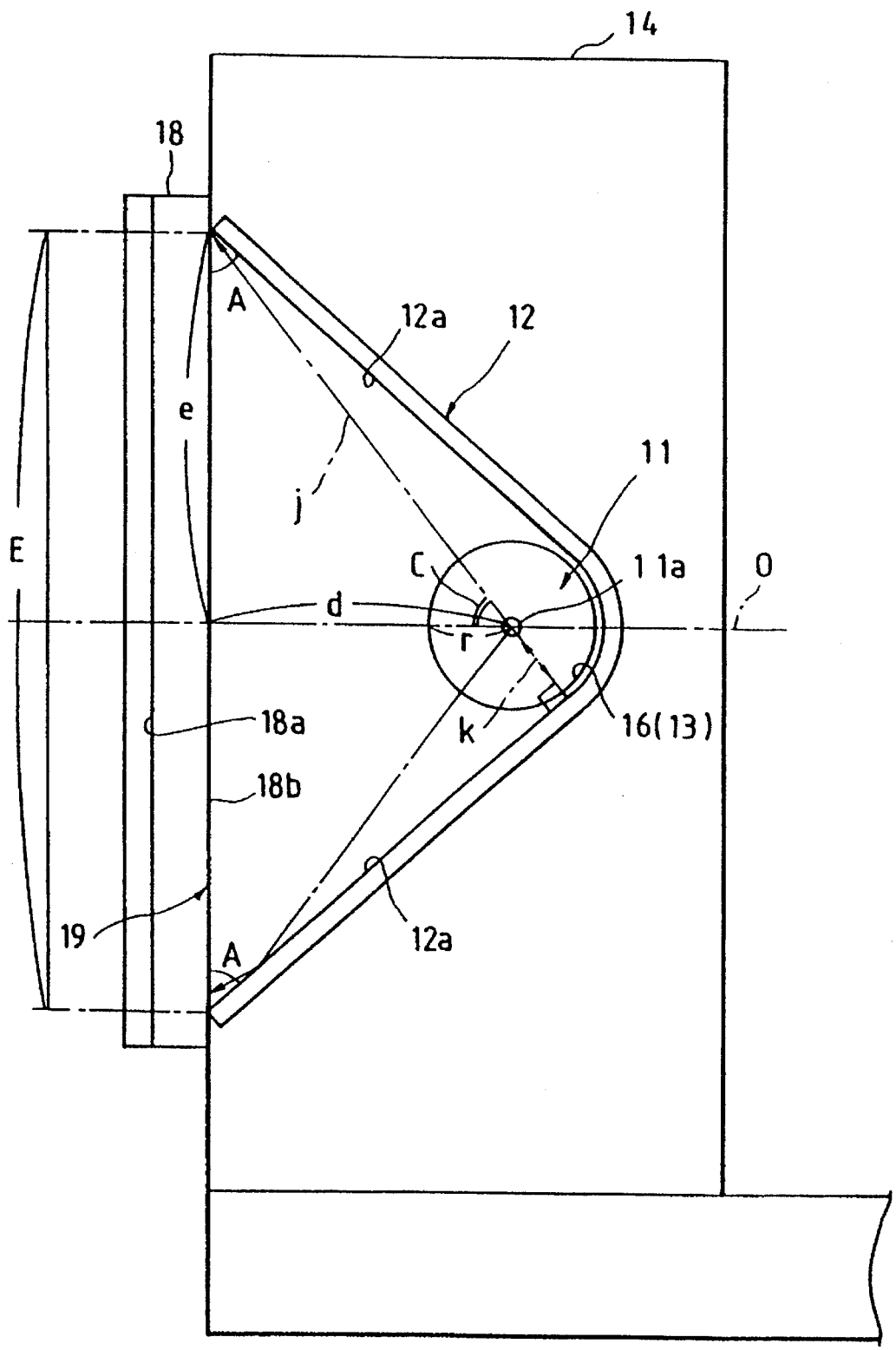
FIG. 5 is a sectional view showing a modification of FIG. 4 in which the Fresnel lens in FIG. 4 is replaced with another lens.

Namely, the Fresnel lens 17 is used in FIG. 4 and a lens 18, different than the Fresnel lens 17, is used in FIG. 5.

In FIGS. 4 and 5, the reflecting mirror 12 is associated with the Fresnel lens 17 or the lens 18 so that light emitted from the opening 19 defined by the edges of the second reflecting surfaces 12a is distributed over an area defined by ±26.5° in the vertical direction and ±35° in the horizontal direction. The distribution area is defined by the guide number (GN) which is smaller by 1 EV than the guide number at the center of the distribution.

The reduced quantity of light X(EV) at the circumferential portion of the distribution area is given by;

$$X(EV)=\log(GN1/GN0)^2/\log^2$$

wherein GN1 designates the guide number at the circumferential portion of the distribution, and GN0 designates the guide number at the center portion of the distribution.

In the arrangements shown in FIGS. 4 and 5, the reflecting mirror 12 is shaped so that the second reflecting surfaces 12a are connected at the front ends thereof to the Fresnel lens 17 (FIG. 4) or the lens 18 (FIG. 5) at an angle A; and the beams "j" emitted from the light emitting point 11a at an illumination angle C concur with the beams "k" emitted from the light emitting point 11a in the opposite directions and reflected by the reflecting mirror 12.

The second reflecting surfaces 12a are shaped to satisfy the following equations (1) and (2):

$$\sin(A) \approx \{r+(r^2+8e^2)^{1/2}\}/4e \quad (1)$$

$$e \approx d \cdot \tan(A) \quad (2)$$

wherein "e" designates the half value of the width E of the opening 19 of the second reflecting surfaces 12a; "r" the radius of a circle in cross section of the light emitting tube; and "d" the distance between the light emitting point 11a of the light emitting tube 11 and the opening 19 along the illumination light axis O, respectively.

To satisfy the above equations (1) and (2), in an example, A=50°; r=1.25 mm; e=5.5 mm; and, d=4.6 mm.

The Fresnel lens 17 is made by adding Fresnel lens characteristics to an aspheric lens; the aspheric lens having the following lens data:

R=11 mm
K=−9.5; where
R=radius of curvature in the vicinity of the optical axis; and
K=cone coefficient.

The reflecting mirror 12 shown in FIGS. 4 and 5 is shaped, specifically at a first reflecting surface 13, so that direct light emitted from the light emitting point 11a towards the opening 19 concurs with light emitted from the light emitting point 11a in the opposite direction and reflected by the reflecting mirror 12, as mentioned above. Consequently, neither the direct light nor the reflected light are substantially emitted at an angle larger than "C". Moreover, two or more reflections do not occur.

Consequently, it is possible to interchangeably attach various lenses 18 having different powers, including the Fresnel lens 17, to the support 14, depending on the angle of view. For instance, if the lens 18 is a variable power lens, a zoom strobe would be realized.

Figure 6:
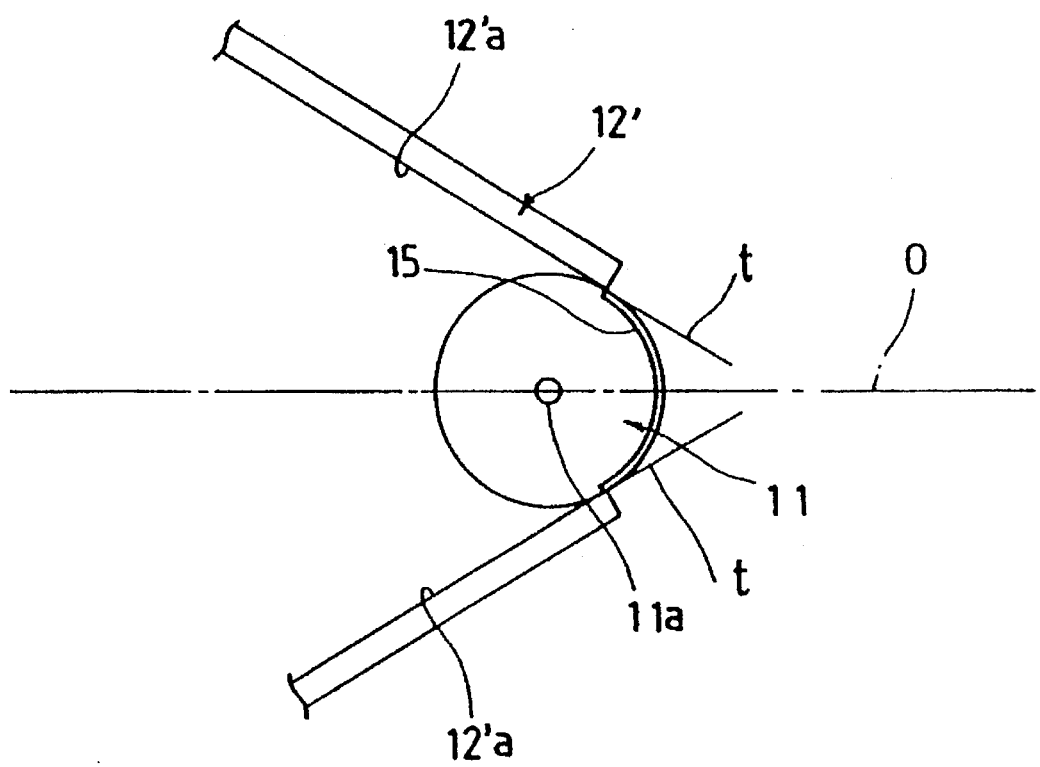
FIG. 6 is a sectional view of a strobe device, according to a fourth embodiment of the present invention, in which upper and lower second reflecting surfaces are separate members, along an optical axis of illumination light.

FIG. 6 shows a fourth embodiment of the present invention in which the shape of the reflecting mirror 12' is slightly different from the reflecting mirror 12, shown in FIGS. 1 through 5, in which the arch-shaped first reflecting surface 13 is defined by the inner peripheral surface of the recess 16 located at the rear end of the reflecting mirror 12. In the fourth embodiment shown in FIG. 6, the reflecting mirror 12' includes the upper and lower second reflecting surfaces 12a' formed by separate flat plates extending along respective tangential lines "t" of the light emitting tube 11 in a symmetrical arrangement. However, a first reflecting surface 15 is formed on the inner surface of the light emitting tube 11. The operation and function of the reflecting mirror 12' are substantially the same as those of the reflecting mirrors 12 shown in FIGS. 1 through 5.

It was necessary to independently design the reflecting mirror and the Fresnel lens in order to obtain a desired light distribution in the prior art. This, however, requires a complicated design, particularly in case of a zoom lens.

Conversely, in the present invention, the shape of the Fresnel lens 17 or the lens 18 can be determined after the shape of the reflecting mirror 12 (or 12') is determined, thus resulting in a simplified design.

Figure 7:
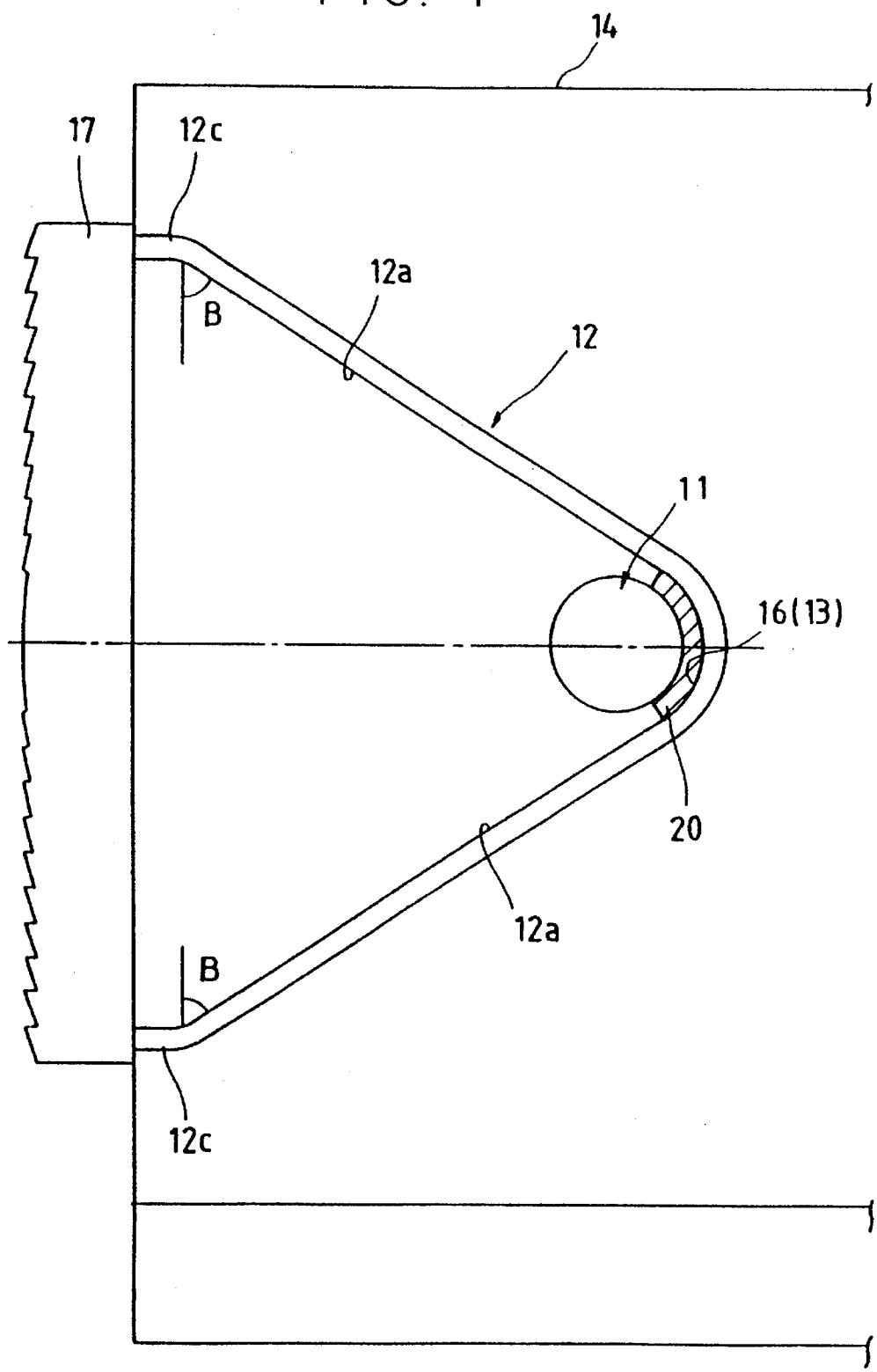
FIG. 7 is a sectional view of a strobe device, according to a fifth embodiment of the present invention, along an optical axis of illumination light.

FIG. 7 shows a fifth embodiment of the present invention. The reflecting mirror 12 in FIG. 7 differs from that in FIG. 1 only in the following points. Namely, in FIG. 7, connecting ends 12c are provided at the front ends of the second reflecting surfaces 12a, similar to the second embodiment (FIG. 2); the diameter of the light emitting tube 11 is reduced; and a supporting spacer 20 is provided between the light emitting tube 11 and the recess 16 (first reflecting surface 13). The connecting ends 12c are connected to the rear wall of the Fresnel lens 17 at a right angle. The second reflecting surfaces 12a are connected to the connecting ends 12c at an angle "B" (e.g., B=57°). In the illustrated embodiment, the supporting spacer 20 is made of a transparent material, but is not limited thereto. For example, it is possible to form a reflecting surface on the surface of the supporting spacer 20 that comes into contact with the light emitting tube 11. The technical effects obtained by the reflecting mirror 12 in the previous embodiments can be expected from the reflecting mirror 12 shown in FIG. 7.

According to the reflecting mirrors shown in FIGS. 1 through 7 of the present invention, since there is no useless space, as is inevitably provided around a conventional elliptical reflecting mirror, a small and simple strobe device can be realized.

Namely, the elliptical reflecting mirror used in a conventional strobe device cannot be easily attached to a holder, such as a camera body or strobe body, thanks to the elliptical shape thereof. Furthermore, it is very difficult to precisely machine such an elliptical reflecting mirror. Moreover, in the elliptical reflecting mirror in which the light emitting tube is located at the inner and rear portion thereof, the difference in curvature between the elliptical reflecting mirror and the light emitting tube makes it difficult to closely mount the elliptical reflecting mirror to the light emitting tube.

These drawbacks can be solved in the reflecting mirrors according to the present invention illustrated in FIGS. 1 through 7.

Namely, since the second reflecting surfaces 12a are simply made of flat plates, they can be easily attached to the holder and do not require a large mounting space, so that the length and shape of the strobe can be reduced in the optical axis direction O and can be simplified. The reflecting mirror according to the present invention can be precisely and easily machined, thus resulting in a simple and compact strobe device.

Since the curvature of the recess 16 (first reflecting surface 13) is identical to that of the light emitting tube 11, the latter can be stably and easily mounted to the recess 16. Furthermore, since the recess 16 is smoothly connected to the second reflecting surfaces 12a in the arrangements, except for FIG. 3, there is no sudden change in curvature between the recess 16 (first reflecting surface 13) and the second reflecting surfaces 12a, unlike prior art in which the rear end of the reflecting mirror is steeply bent so as to snugly receive the light emitting tube. Consequently, according to the present invention, the direction of the reflected light is predictable, and accordingly, a uniform distribution of light can be obtained owing to an absence of unpredictable light. This is because the beams emitted from the light emitting tube 11 behave as explained above with reference to FIG. 1.

Furthermore, since the shape of the reflecting mirror 12 is mainly determined by the second reflecting surfaces 12a and the mounting angle thereof with respect to the optical axis O, the reflecting mirror 12 can be easily checked and inspected. Consequently, an optical property of an assembly of the reflecting mirror 12, the light emitting tube, and the Fresnel lens can be easily estimated.

Figure 8:
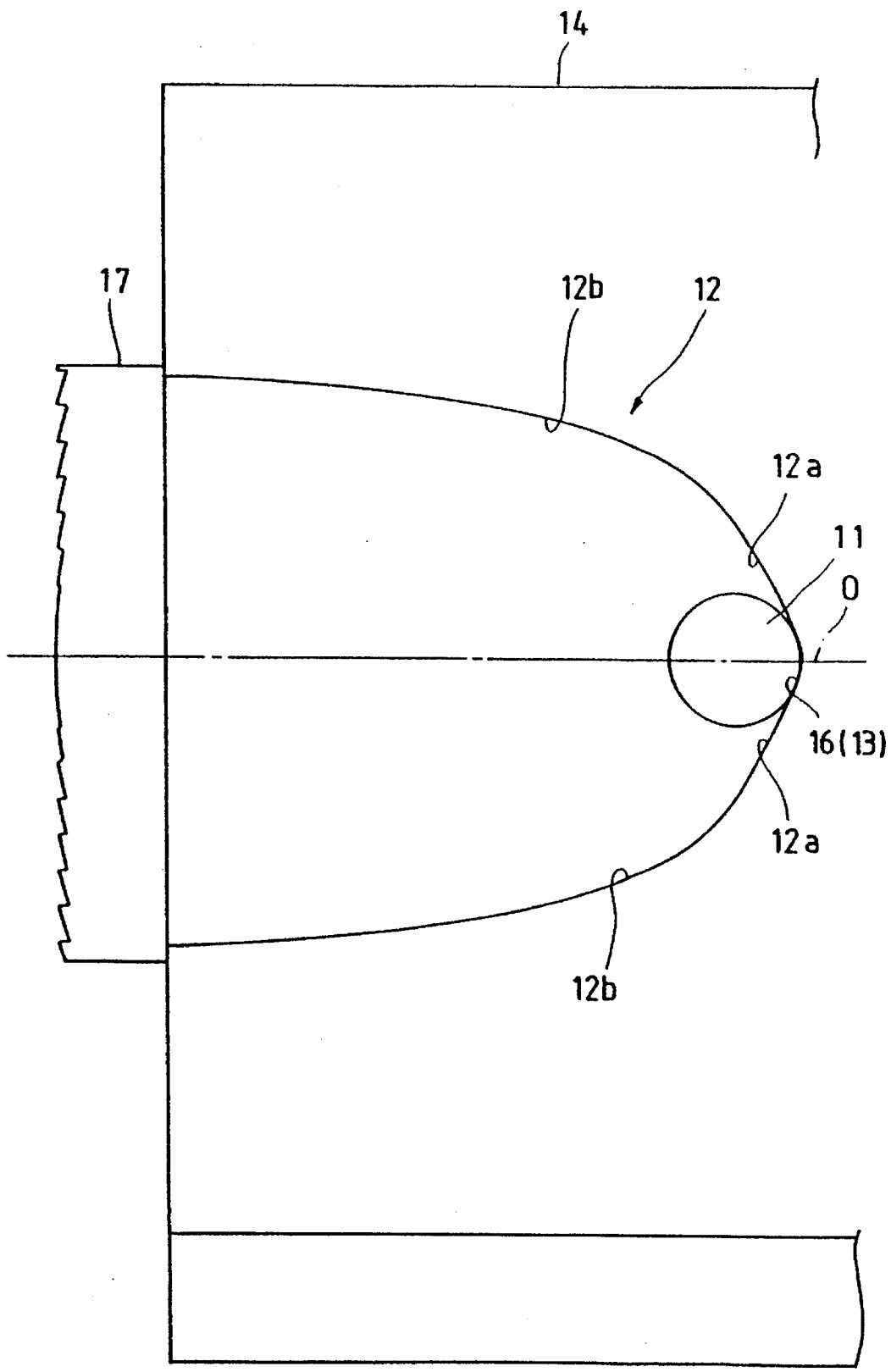
FIG. 8 is a sectional view of a strobe device, according to a sixth embodiment of the present invention, along an optical axis of illumination light.

FIG. 8 shows a sixth embodiment of the present invention. In FIG. 8, the reflecting mirror 12 is substantially elliptical, but is different from the conventional elliptical mirror. Namely, the elliptical reflecting mirror 12 in FIG. 8 is provided with the recess 16 (first reflecting surface 13) at the connecting portion of the light emitting tube and the rear end portion of the reflecting mirror 12. Substantially straight second reflecting surfaces 12a which extend along the tangential planes of the circle defined by the light emitting tube 11 is provided such that the first reflecting surface 13 is connected to the respective elliptical reflecting surfaces 12b through the second reflecting surfaces 12a.

There is minimum irregularity in the light reflected by the reflecting mirror 12, thus resulting in an improved light distribution. Furthermore, the substantially straight second reflecting surfaces 12a contribute to an easy and correct attachment of the reflecting mirror to the holder, unlike the prior art in which an absence of the straight portion makes it difficult to easily mount the reflecting mirror to the holder. Furthermore, since there is no sudden change in curvature of the reflecting surfaces, unpredictable light is not emitted from the strobe of the present invention.

As can be seen from the above discussion, according to the present invention, no real image of the light source (light emitting tube 11) is formed by the reflecting mirror 12. Instead, a virtual image of the light source is formed behind the light source. Direct light emitted from the light source as well as the reflected light reflected by the reflecting mirror 12 at the reflecting portion 13 are emitted forward substantially in the same directions. Consequently, the reduction of the quantity of light is restricted to improve the quantity distribution. Thus, the guide number which is defined by the quantity of light at the center portion can be increased.

The real image of the light emitting point 11a is formed at a position which coincides with that of the light emitting point 11a by the first reflecting surface 13. Therefore, the real image of the light emitting point 11a can be regarded as an equivalent of the light emitting point 11a. Accordingly, unfavorable influences on the light distribution characteristics do not occur.

The following discussion will be directed to seventh and eighth embodiments of the present invention (see, for example, FIGS. 9 and 10), in which the various reflecting mirrors, including the upper and lower second reflecting surfaces, having different inclination angles with respect to the optical axis O, can be selectively used to obtain an optimum quantity distribution in accordance with the luminance distribution on an illumination plane spaced from the strobe device. The seventh and eighth embodiments are based on the principle of the first embodiment shown in FIG. 1. Consequently, it will be understood that the same function and effects as those in the seventh and eighth embodiments can be obtained in the first embodiment.

Figure 13:
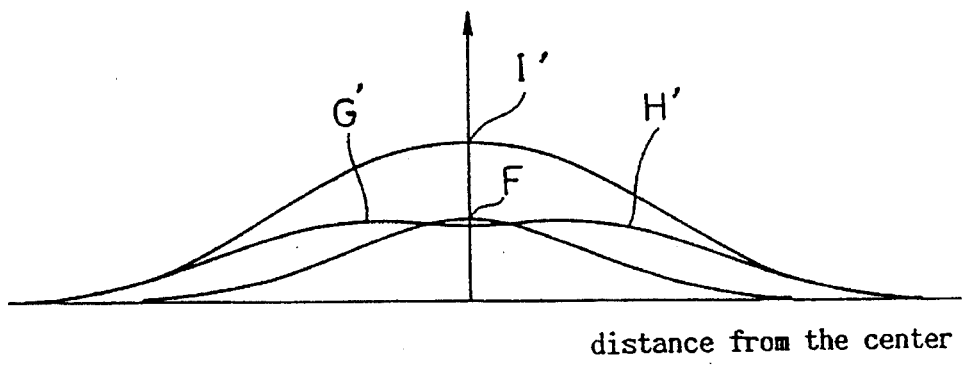
FIG. 13 is an explanatory view of a luminance distribution of a strobe device, according to the first embodiment, shown in FIG. 1.

The reflecting surface 12 in FIG. 1 exhibits a relatively small range of light distribution, since the angle $\alpha_1$ defined by the line (beam) extending from the center "a" of the virtual image towards the center of the Fresnel lens 17 and the optical axis O is relatively small. FIG. 13 shows a relative luminance distribution on an illumination plane (not shown) to be illuminated with a beam flux emitted from the light emitting tube 11 (i.e., real light source), wherein the peak value is indicated at F, by way of example. FIG. 13 also shows a relative luminance distribution on the illumination plane illuminated with a beam flux deemed to be emitted from the virtual images 11' and 11' ( FIG. 1 ), wherein there are two peak values indicated at G' and H'. The resultant luminance distribution having a peak value indicated at I' is also shown in FIG. 13.

In the seventh and eighth embodiments which will be discussed below, the illumination plane on which an optimum luminance distribution should be obtained is located, for example, at a focal length of a lens of an associated camera, so that a strobe device having a beam flux with a desired range of illumination at an optimum light distribution can be realized.

Figure 9:
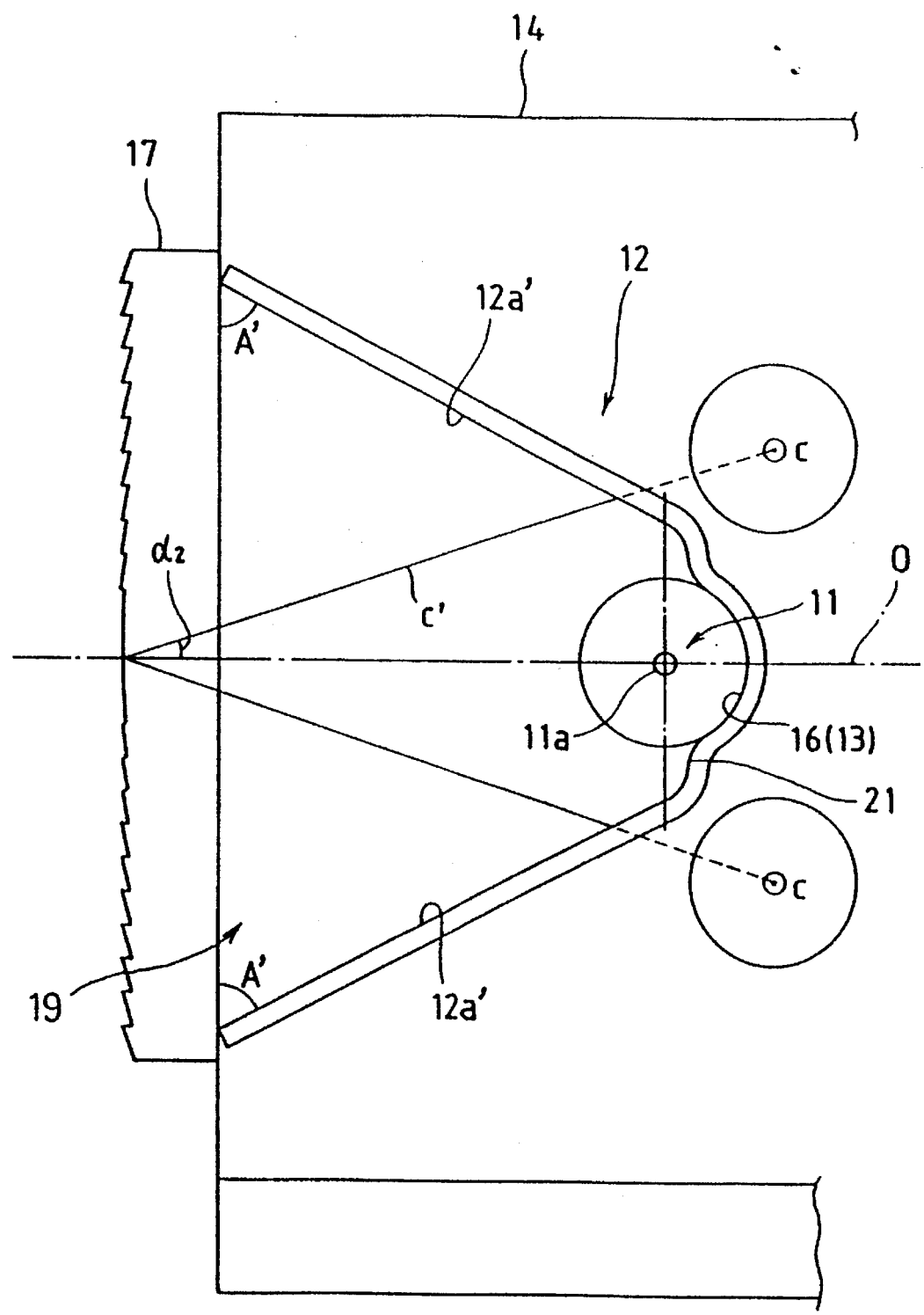
FIG. 9 is a sectional view of a strobe device, according to a seventh embodiment of the present invention, along an optical axis of illumination light.

In the seventh embodiment illustrated in FIG. 9, in which the illumination range (i.e., angle of view) is slightly larger than that of the first embodiment shown in FIG. 1, the reflecting mirror 12 includes first reflecting surface 13 and upper and lower second reflecting surfaces 12a', similar to FIG. 1. The Fresnel lens 17 and the opening 19 at the front surface of the strobe in FIG. 9 are identical to those in FIG. 1, respectively.

The angle A' (63°, for example) defined by the Fresnel lens 17 and one of the reflecting surfaces 12a' *is larger than the corresponding angle A* (60°, for example)in FIG. 1 (A'>A). Note that the distance between the Fresnel lens 17 and the light emitting tube 11 in FIG. 9 is identical to the corresponding distance in FIG. 1. In FIG. 9, the second reflecting surfaces 12a' are smoothly connected to the first reflecting surface 13 by bent connecting portions 21. Preferably, the profile of the bent connecting portions 21 is determined so that the distance between the first reflecting surface 13 and the corresponding second reflecting surfaces 12a' is as small as possible. Namely, the reflecting mirror 12 in FIG. 9 is obtained by rotating the second reflecting surfaces 12a shown in FIG. 1, about the connecting points thereof to the Fresnel lens 17, without moving the connecting points, to move the other ends of the second reflecting surfaces 12a close to or away from the light emitting tube 11, and to thereby vary the angle of view.

In the seventh embodiment shown in FIG. 9, since the second reflecting surfaces 12a' are spaced farther from the light emitting tube 11 than the corresponding distance in the arrangement in FIG. 1, the centers of the virtual images are moved to "c" from "a" (FIG. 1). Consequently, the angle $\alpha_2$ defined between the optical axis O and the line connecting the center "c" of one of the virtual images and the center of the Fresnel lens 17 is changed to, for example, 18.5° $\alpha_2$=18.5° from $\alpha_1$=12.5° (FIG. 1). Thus, $\alpha_2$=18.5° is larger than $\alpha_1$=12.5°, i.e., $\alpha_2 > \alpha_1$. The distance between the light emitting point 11a and the Fresnel lens 17 (including the thickness of the Fresnel lens 17, which is 1.5 mm) is determined to be 7.6 mm.

Figure 12:
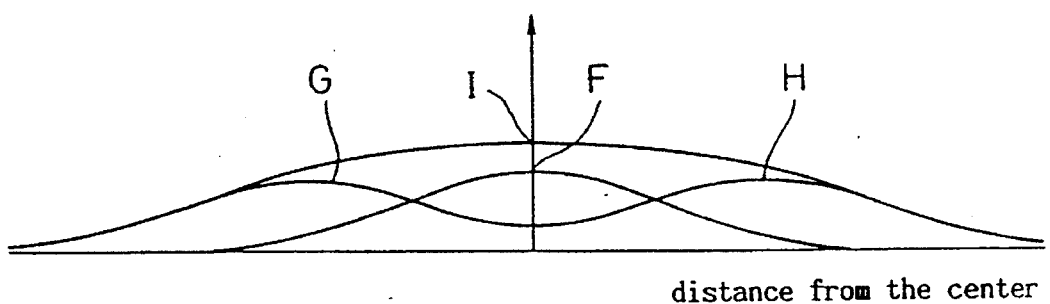
FIG. 12 is an explanatory view of a luminance distribution of the strobe devices shown in FIGS. 9 through 11.

Consequently, the relative luminance distribution in FIG. 13 is changed to a relative luminance distribution as shown in FIG. 12, in which the distance of the peak values G and H corresponding to those G' and H' in FIG. 13, is increased due to the increase in the angle of view ($\alpha_1 \rightarrow \alpha_2$). As a result, the resultant luminance distribution has a peak value indicated at I which is smaller than the peak value I' in FIG. 13. As can be seen from FIG. 12, the peak luminance value at the center portion of the distribution is decreased, but the illumination range is extended.

Figure 10:
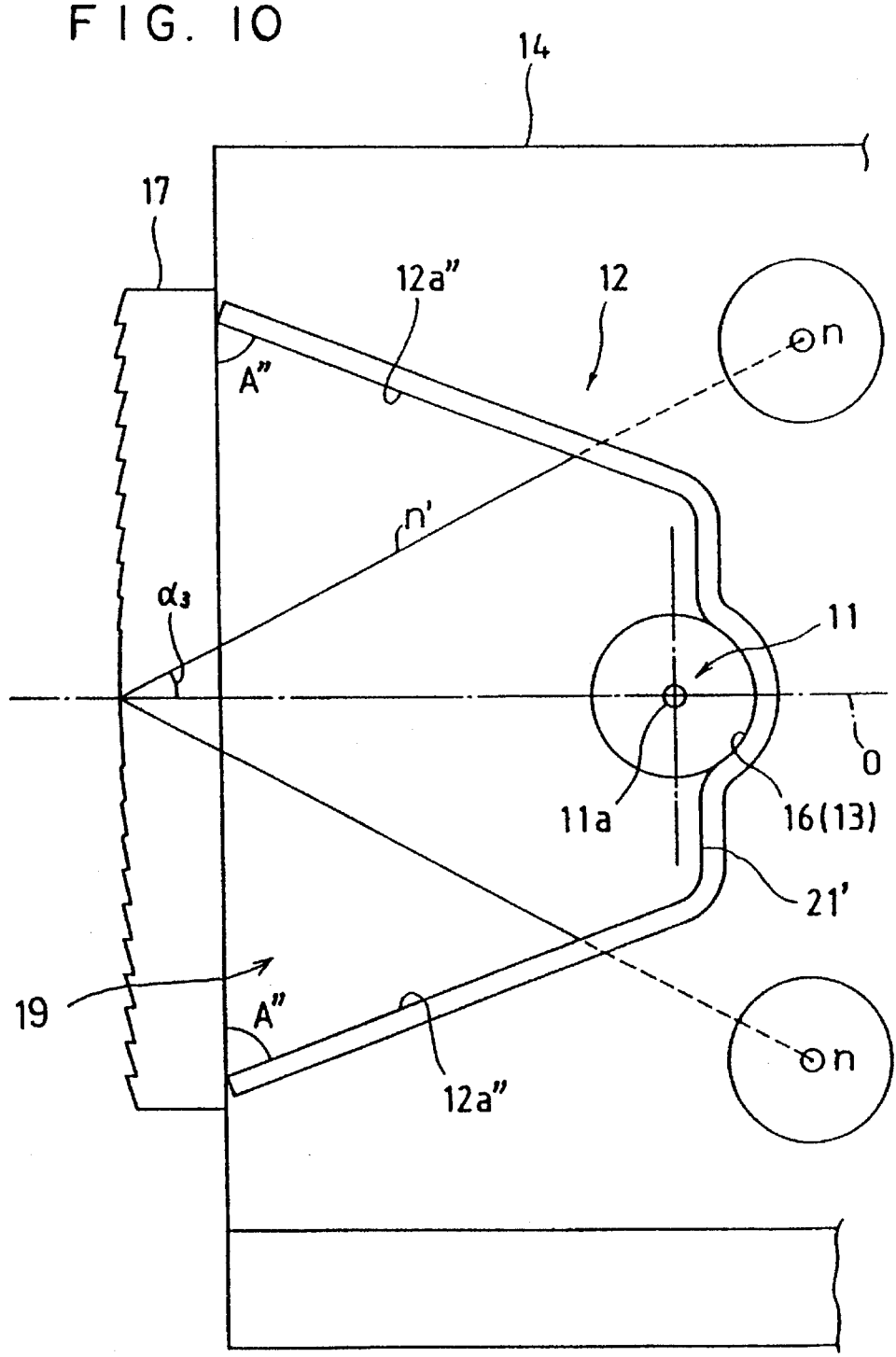
FIG. 10 is a sectional view of a strobe device, according to an eighth embodiment of the present invention, along an optical axis of illumination light.

In the eighth embodiment illustrated in FIG. 10, the angle A" (70°, for example) defined by the Fresnel lens 17 and one of the second reflecting surfaces 12a" is larger than the angles A (FIG. 1) and A' (FIG. 9), i.e., A">A'>A, to obtain a larger illumination range than that in FIG. 9.

The distance between the Fresnel lens 17 and the light emitting tube 11 in FIG. 10 is the same as that in FIGS. 1 and 9. Accordingly, the second reflecting surfaces 12a" are smoothly connected to the first reflecting surface 13 by the straight connecting portions 21' which are made as short as possible and which are lustered. Consequently, the centers "n" of the virtual images are located farther from the light emitting tube 11 than the centers "c" of the virtual images in FIG. 9. Consequently, the angle $\alpha_3$ defined by the optical axis O and the line connecting the center "n" of one of the virtual images and the center of the Fresnel lens 17 is larger than the angles $\alpha_1$ (FIG. 1) and $\alpha_2$ (FIG. 9). Namely, $\alpha_3 > \alpha_2 > \alpha_1$. Thus, the illumination range in FIG. 10 becomes larger than that in FIG. 9.

As can be understood from the above discussion, a plurality of reflecting mirrors 12, including the second reflecting surfaces 12a (12a', 12a") having different inclination angles A (A', A") are prepared and selectively used to vary the luminance distribution on the illumination plane spaced from the strobe device, in accordance with need. Namely, it is possible to move the positions of the virtual images formed behind the second reflecting surfaces in order to move the positions of the peak values G, H (G', H') away from or close to the peak value F in the luminance distribution shown in FIGS. 12 or 13. Consequently, various strobe devices exhibiting different luminance distributions can be easily produced in accordance with the distance of the target illumination plane from the strobe device.

Figure 11:
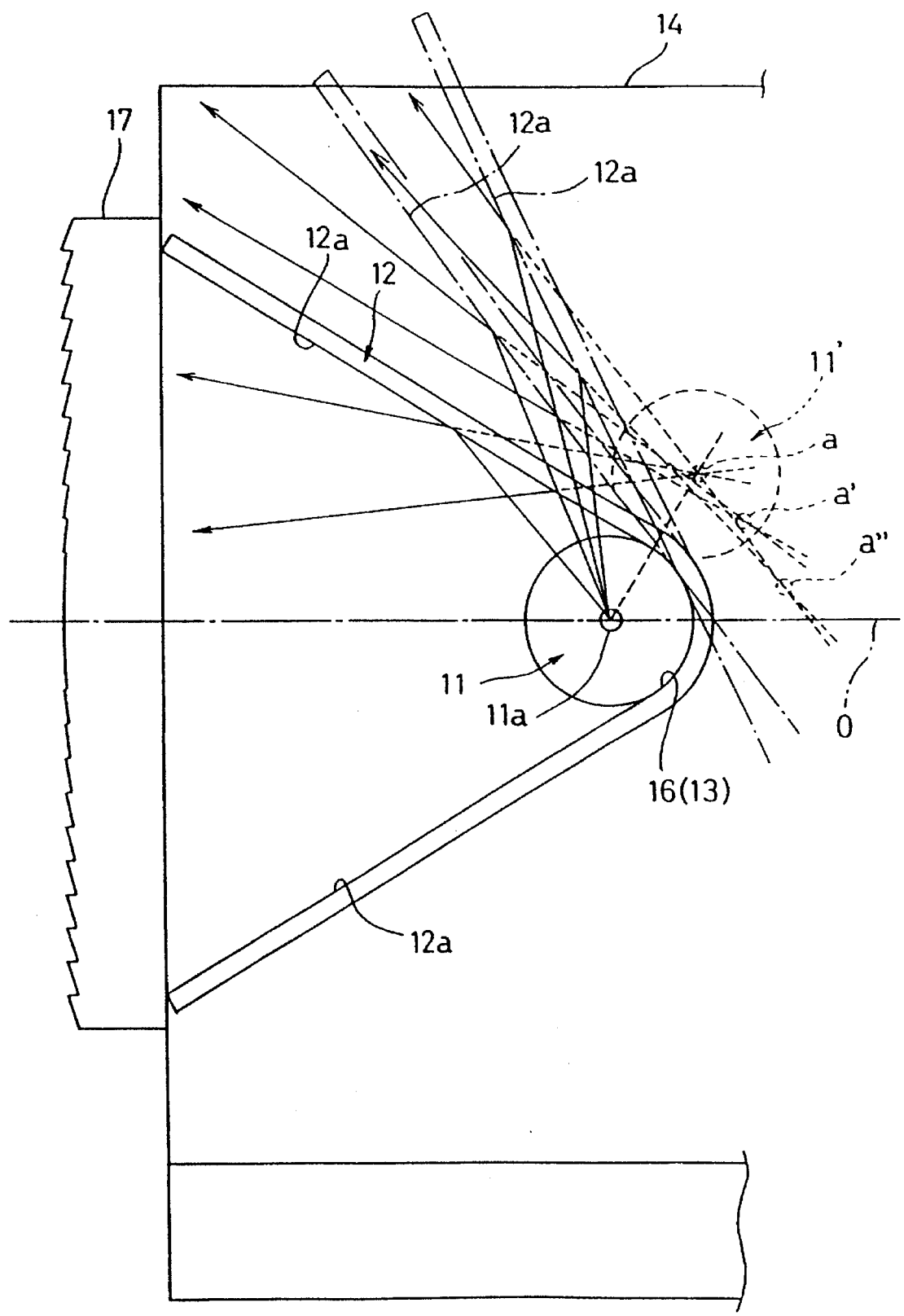
FIG. 11 is a sectional view of a strobe device, according to a ninth embodiment of the present invention, along an optical axis of illumination light.

Although the ends of the second reflecting surfaces 12a (12a', 12a"), that are located far from the ends thereof connected to the Fresnel lens 17, are moved away from or close to the light emitting tube 11 to adjust the angle A (A', A") in the first, seventh and eighth embodiments, it is alternatively possible to move the ends of the second reflecting surfaces 12a adjacent to the Fresnel lens 17 away from or close to the Fresnel lens 17 to change the inclination angle of the second reflecting surfaces 12a with respect to the optical axis O, as shown in FIG. 11. Namely, in the ninth embodiment shown in FIG. 11, the ends of the second reflecting surfaces 12a adjacent to the light emitting tube 11 are selectively bent at different angles along the tangential lines of the light emitting tube 11 in accordance with the angle of view. In the ninth embodiment, the center "a" of the virtual image 11' is moved to "a'" or "a''" to change the illumination angle and thereby control the light quantity distribution, similar to the aforementioned embodiments.

As can be seen from the above discussion, according to the embodiments shown in FIGS. 9 through 11, a plurality of reflecting mirrors 12, including the second reflecting surfaces 12a having different inclination angles, are prepared and selectively used to vary the luminance distribution on a desired illumination plane spaced from the strobe device. Consequently, the structure of the strobe device in the present invention can be simplified in comparison with the prior art using an elliptical or parabolic reflecting mirror whose shape is designed in accordance with the optical balance between the reflected light and the lens located on the front face of the strobe device to adjust the quantity distribution.

In the embodiments illustrated in FIGS. 9 through 11, although a plurality of reflecting mirrors 12, including the second reflecting surfaces 12a having different inclination angles, are prepared and selectively used, as mentioned above, it is possible to provide a single reflecting mirror in which the inclination angle of the second reflecting surfaces 12a is adjustable in accordance with, for example, the zooming operation of the associated camera, so that the angle of view (illumination angle) can be appropriately varied when a picture is taken using the strobe device, according to the present invention.

A tenth embodiment of the present invention will be discussed below in which a pair of reflecting plates (i.e., reflecting surfaces) on opposite sides of the light source are rotatable about the ends thereof located away from the light source, to move the other ends of the reflecting plates far away or close to the light source and thereby vary the angle defined by the reflecting plates. The reflecting plates used in the tenth embodiment correspond to the second reflecting surfaces 12a in the first embodiment illustrated in FIG. 1.

Figure 14:
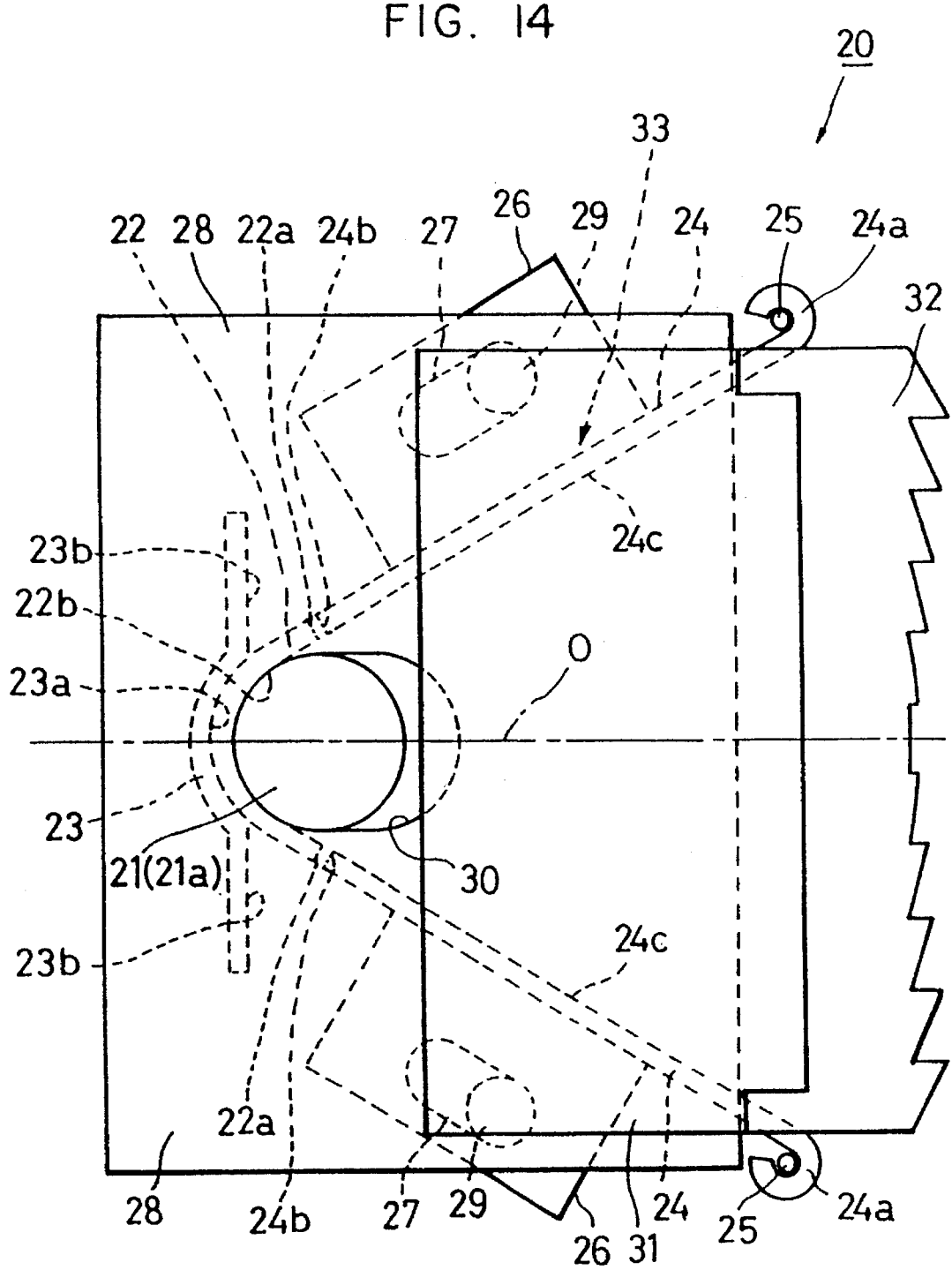
FIG. 14 is a side elevation view of a strobe device having a reflecting mirror whose illumination angle is variable according to a tenth embodiment of the present invention.
Figure 15:
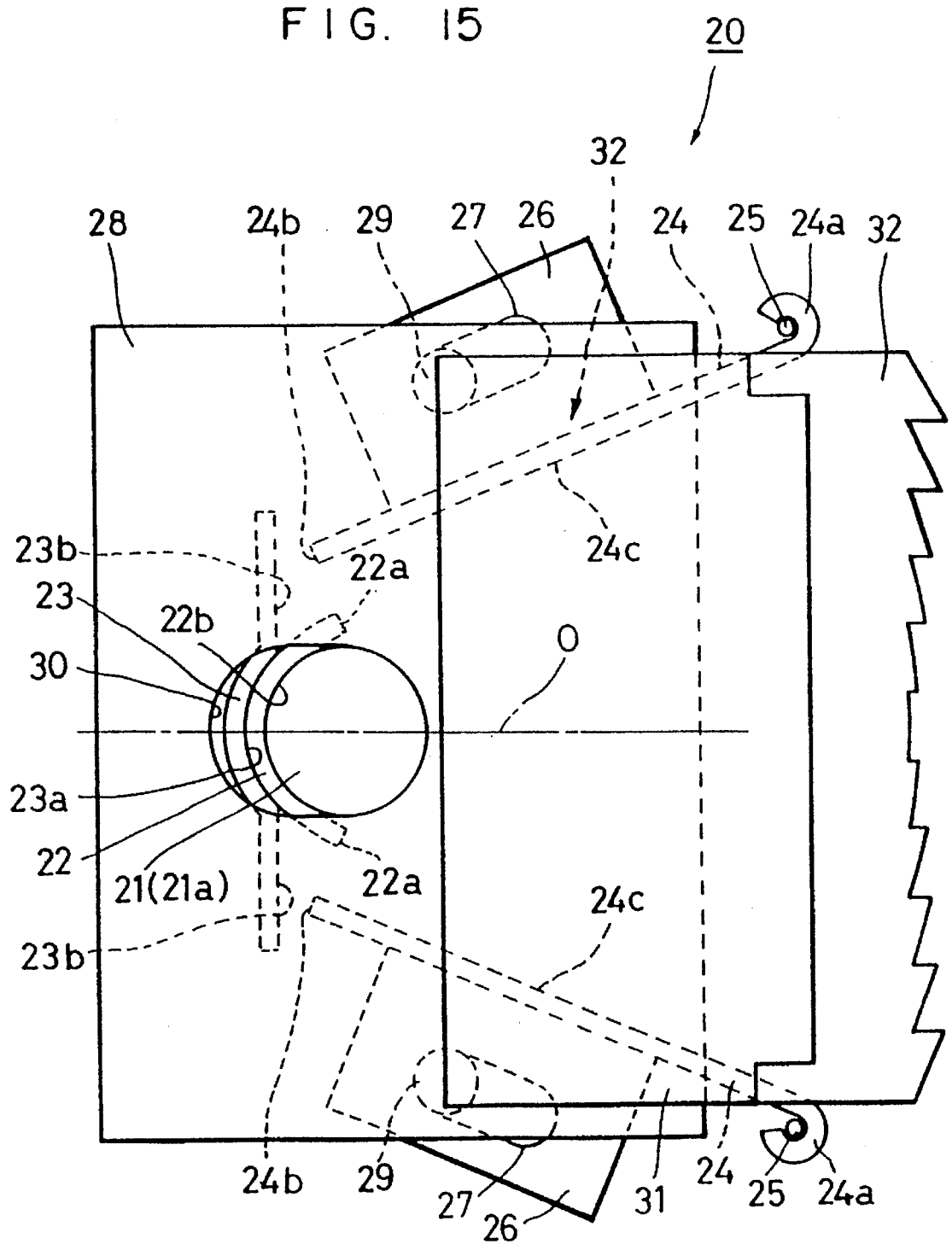
FIG. 15 is a side elevation view of a strobe device, according to the present invention, shown in a position different from FIG. 14.
Figure 16:
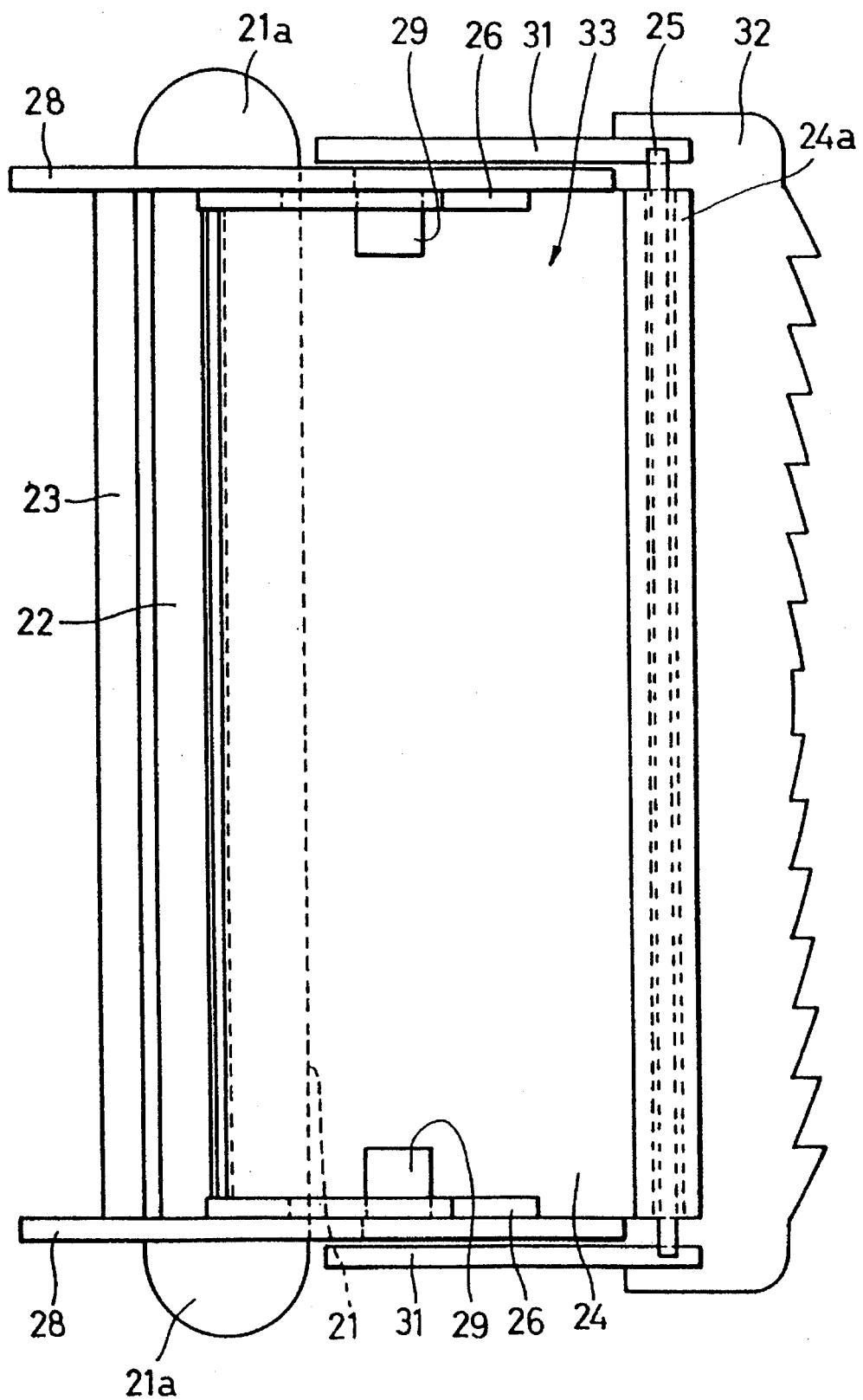
FIG. 16 is a plan view of a strobe device shown in FIG. 14.

The strobe device shown in FIGS. 14 through 16 has a reflecting mirror 33 that includes the same features as the reflecting mirror 12 shown in FIG. 1. FIGS. 14 through 16 show an embodiment of a strobe device 20 having a variable illumination angle.

The strobe device 20 has a pair of right and left stationary plates 31 secured to the strobe body, so that the Fresnel lens 32 to be placed at the frontmost position of the strobe device 20 is mounted to the stationary plates 31. To the strobe body are secured two pivot shafts 25 which are located in a line-symmetry on upper and lower sides of the optical axis O of the Fresnel lens 32, a light emitting tube 21, such as a xenon tube, etc., located on the optical axis O, a first stationary reflecting plate 22 which is in close contact with the rear portion of the light emitting tube 21, and a second stationary reflecting plate 23 which is in close contact with the rear portion of the first reflecting plate 22. The optical axis O is included in a plane of an illumination axis passing through a section taken along the longitudinal axis of the light emitting tube 21.

The first reflecting plate 22 is bent in an arch-shape along the outer surface of the light emitting tube 21 and is provided on the inner surface thereof with a reflecting surface 22b. The upper and lower ends 22a of the first reflecting plate 22 are separated from the light emitting tube 21 to linearly extend forward along the tangential lines of the light emitting tube 21. The second reflecting plate 23 consists of an archwise bent portion 23a along the curvature of the first reflecting plate 22 which comes into close contact with the rear surface of the first reflecting plate 22, and upper and lower vertical reflecting surfaces 23b extending from the bent portion 23a in the upwards and downwards directions.

The upper and lower pivot shafts 25 rotatably support respective movable reflecting plates 24, each having a reflecting surface 24c. The movable (rotatable) reflecting plates 24 are located in a symmetrical arrangement with respect to the optical axis O on opposite sides thereof. The movable reflecting plates 24 have free ends 24b located adjacent to the light emitting tube 21 and the other ends 24a thereof are rotatably connected to the respective pivot shafts 25. Consequently, the movable reflecting plates 24 are rotated about the respective pivot shafts 25 to move the free ends 24b thereof away from or close to the upper or lower ends 22a of the first stationary reflecting plate 22 and the light emitting tube 21 to vary the angle defined by and between the movable reflecting plates 24. The movable reflecting plates 24, the first stationary reflecting plate 22, and the second stationary reflecting plate 23 constitute a reflecting mirror 33. The movable reflecting plates 24 are provided with the substantially straight reflecting surfaces 24c. Accordingly, no real images of the light emitting tube 21 are formed. Instead, virtual images of the light emitting tube 21 are formed behind the reflecting surfaces 24c, thus resulting in no reduction of the quantity of light to be utilized, as discussed above with reference to the first embodiment.

Each of the movable reflecting plates 24 is provided, on the rear surface thereof opposite to the reflecting surface 24c, with a pair of parallel plate members 26 which lie in planes perpendicular to the respective reflecting plates 24. The plate members 26 are located at opposite side ends (i.e., upper end lower ends in FIG. 16) of the rear surface of each movable reflecting plate 24. Each plate member 26 has an elongated cam groove 27 which extends in parallel with the associated reflecting surface 24c.

A pair of slide cam plates 28 are slidably provided between the right and left ends of the movable reflecting plates 24 and the right and left stationary plates 31. The cam plates 28 are connected to each other by a connecting member (not shown) so as to slide together in the optical axis direction. Each cam plate 28 is provided thereon with a pair of upper and lower cam pins 29 which are fitted in the associated elongated cam grooves 27 of the plate members 26, so that when the cam plates 28 are moved linearly in the optical axis direction O, the movable reflecting plates 24 are rotated about the respective pivot shafts 25 to move the free ends 24b thereof away from or close to the light emitting tube 21. The slide cam plates 28 are also provided with guiding elongated holes 30 whose main axes extend in the optical axis direction O. The light emitting tube 21 is inserted at the right and left ends 21a thereof in the guiding elongated holes 30, so that the slide cam plates 28 are slidable in the optical axis direction O.

The strobe device 20 as constructed above operates as follows.

When the slide cam plates 28 are manually moved or automatically moved by a driving mechanism (not shown) to the frontmost position closest to the Fresnel lens 32 in the optical axis direction O, the upper and lower movable reflecting plates 24 are rotated about the respective pivot shafts 25 through the cam pins 29, the cam grooves 27, and the plate members 26, so that the rear ends 24b (free ends) of the reflecting plates 24 come closest to the light emitting tube 21, and accordingly, to the corresponding upper and lower ends 22a of the first stationary reflecting plate 22. This corresponds to a telephoto position in a telephotographic lens in which the illumination angle is small (FIG. 14).

Conversely, when the slide cam plates 28 are moved to the rearmost position farthest from the Fresnel lens 32 in the optical axis direction O, the upper and lower movable reflecting plates 24 are rotated about the respective pivot shafts 25, so that the rear ends 24b of the reflecting plates 24 come closest to the light emitting tube 21, and accordingly the corresponding upper and lower ends 22a of the first stationary reflecting plate 22. This corresponds to a wide-angle position in a telephotographic lens in which the illumination angle is large (FIG. 15). Thus, the illumination angle of the strobe device 20 can be adjusted by the movement of the slide cam plates 28 in the optical axis direction O.

Figure 17:
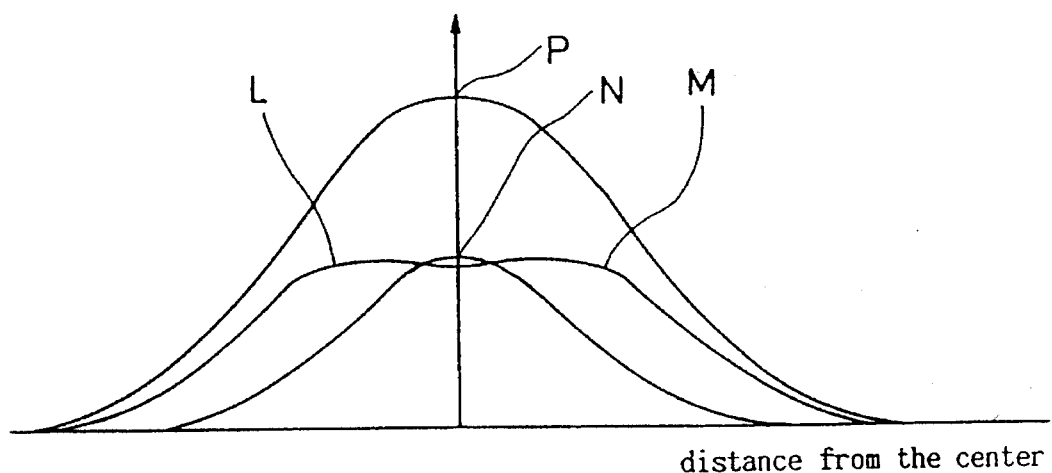
FIG. 17 is an explanatory view of a luminance distribution of the strobe device shown in FIG. 14 in a telephoto position.
Figure 18:
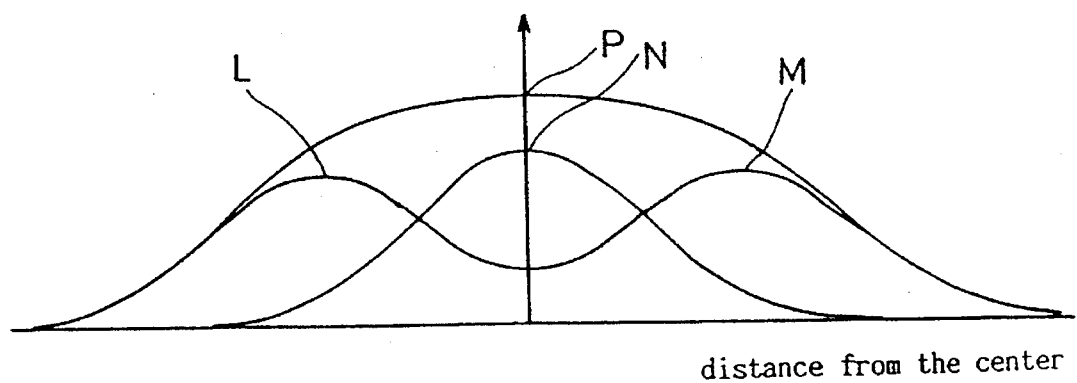
FIG. 18 is an explanatory view of a luminance distribution of the strobe device shown in FIG. 14 in a wide-angle position.

FIGS. 17 and 18 show relative luminance distributions of the strobe device 20 in the vertical direction in FIG. 14. In FIGS. 17 and 18, "N" designates the relative luminance distribution on an illumination plane (not shown) to be illuminated with a bundle of direct beams emitted from the light emitting tube 21 (real light source); "L" and "M" the relative luminance distributions on an illumination plane (not shown) to be illuminated with bundles of beams from the virtual images formed by the reflecting surfaces 24c of the upper and lower movable reflecting plates 24; and "P" the resultant luminance distribution of the relative luminance distributions "L", "M" and "N".

FIGS. 17 and 18 show the luminance distributions when the strobe device 20 is in the telephoto position shown in FIG. 14 and in the wide-angle position shown in FIG. 15, respectively. Comparing FIGS. 17 and 18, the peak value at the center of the luminance distribution in FIG. 17 corresponding to the telephoto position of the strobe device 20, shown in FIG. 14, is higher than the peak value at the center of the luminance distribution in FIG. 18 corresponding to the wide-angle position shown in FIG. 15. The concentration of the quantity of light at the center of the distribution is advantageous for the telephoto position.

Conversely, when the strobe device 20 is in the wide-angle position shown in FIG. 15, the resultant luminance distribution P exhibits a smoother curve to cover a wider illumination range than the resultant luminance distribution in FIG. 17. The distribution shown in FIG. 18 is advantageous for the wide-angle position.

The illumination angle of the strobe device 20 is manually adjustable or mechanically adjusted by the driving mechanism (not shown), as mentioned above. Alternatively, it is also possible to vary the illumination angle in association with the change of the focal length of the associated camera (not shown) to which the strobe device 20 is to be mounted. In this alternative, the angle defined by the reflecting surface of one of the movable reflecting plates 24 and a plane perpendicular to the optical axis O is set to be, for example, 60°, and the positive power of the Fresnel lens 32 is appropriately selected to correspond to the angle of view at the focal length of 50 mm in a 35 mm camera (Leica format), so that the resultant luminance distribution shown in FIG. 17 corresponds to the focal length of 50 mm in a camera for a 35 mm film. If the angle defined by the reflecting surface of one of the movable reflecting plates 24 and the plane perpendicular to the optical axis O is set 63°, the resultant luminance distribution shown in FIG. 18 is obtained, which corresponds to a focal length of 35 mm. Namely, in case of a zoom lens in which the focal length of the taking lens is variable in a range of 35 mm to 50 mm, the angle defined by the reflecting surface of one of the movable reflecting plates 24 and the plane perpendicular to the optical axis O is varied within a range of 60° to 63°.

In the illustrated embodiment, when the diameter of the light emitting tube 21 is about 2.5 mm and the vertical length of the opening 19 (FIG. 4) is about 12 mm, the angle defined by the reflecting surface of one of the movable reflecting plates 24 and the plane perpendicular to the optical axis O is preferably varied in a range of around 60° to 70°.

The association of the strobe device 20 with the change of the focal length of the camera is carried out by, for example, a device for transmitting the movement of the movable zoom lens barrel incorporated in the camera to the slide cam plates 28 through a gear train or a cam mechanism, or a device for driving a stepping motor or the like in response to focal length data which can be read through a zoom code plate provided in the movable zoom lens barrel to move the slide cam plates 28.

As can be seen from the above discussion, according to the tenth embodiment, since the quantity of light emitted from the light emitting tube 21 can all be substantially received by the Fresnel lens 32 (condenser lens) provided on the front face of the strobe device 20 irrespective of the telephoto state or wide-angle state, the light gathering capability can be enhanced in comparison with the prior art. Moreover, the illumination angle can be easily varied without providing a complex mechanism or large condenser lens to effectively gather the light emitted from the light source Accordingly, a small and inexpensive strobe device having a uniform luminance distribution can be obtained.

Figure 19:
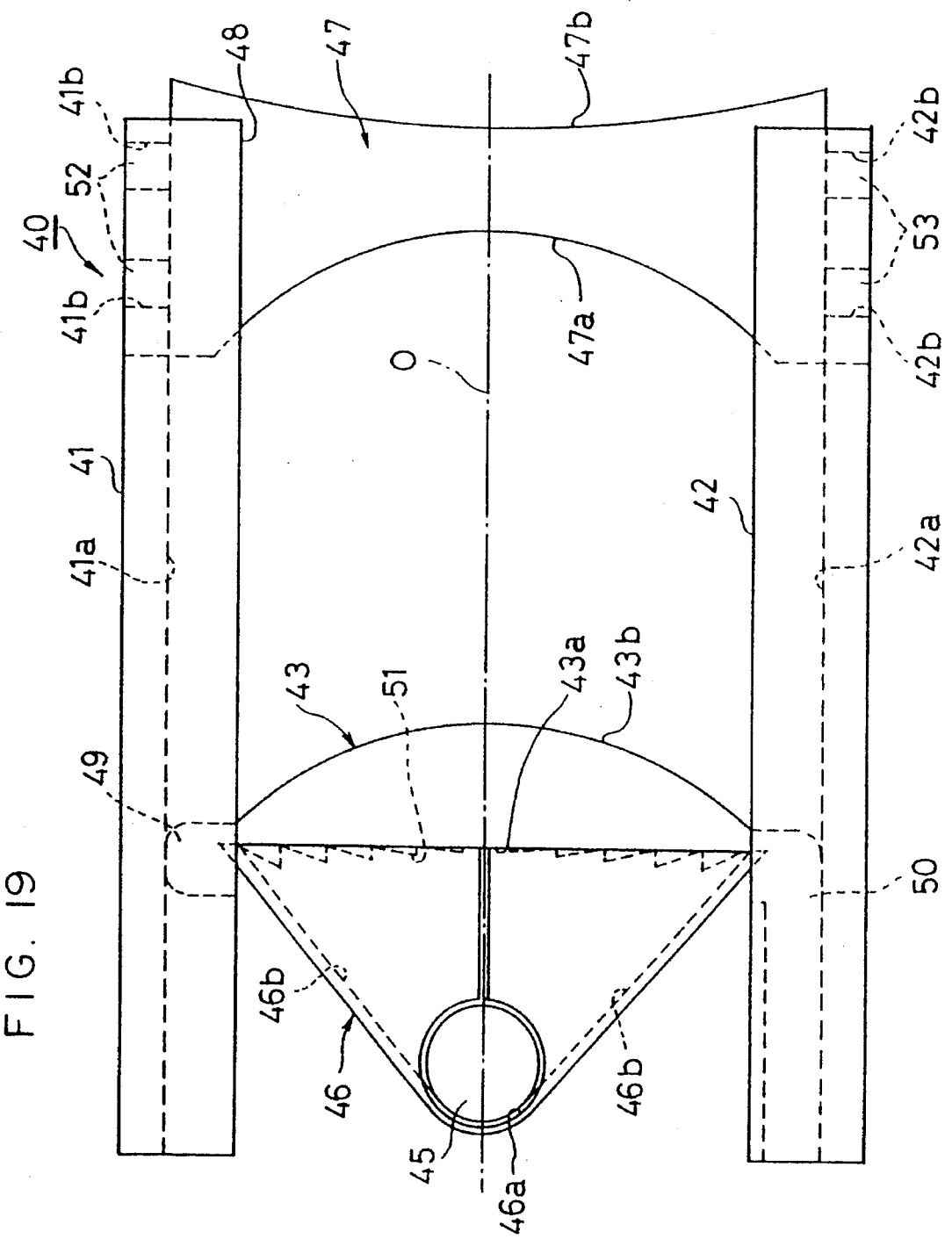
FIG. 19 is a side elevation view of a strobe device according to an eleventh embodiment of the present invention.
Figure 20:
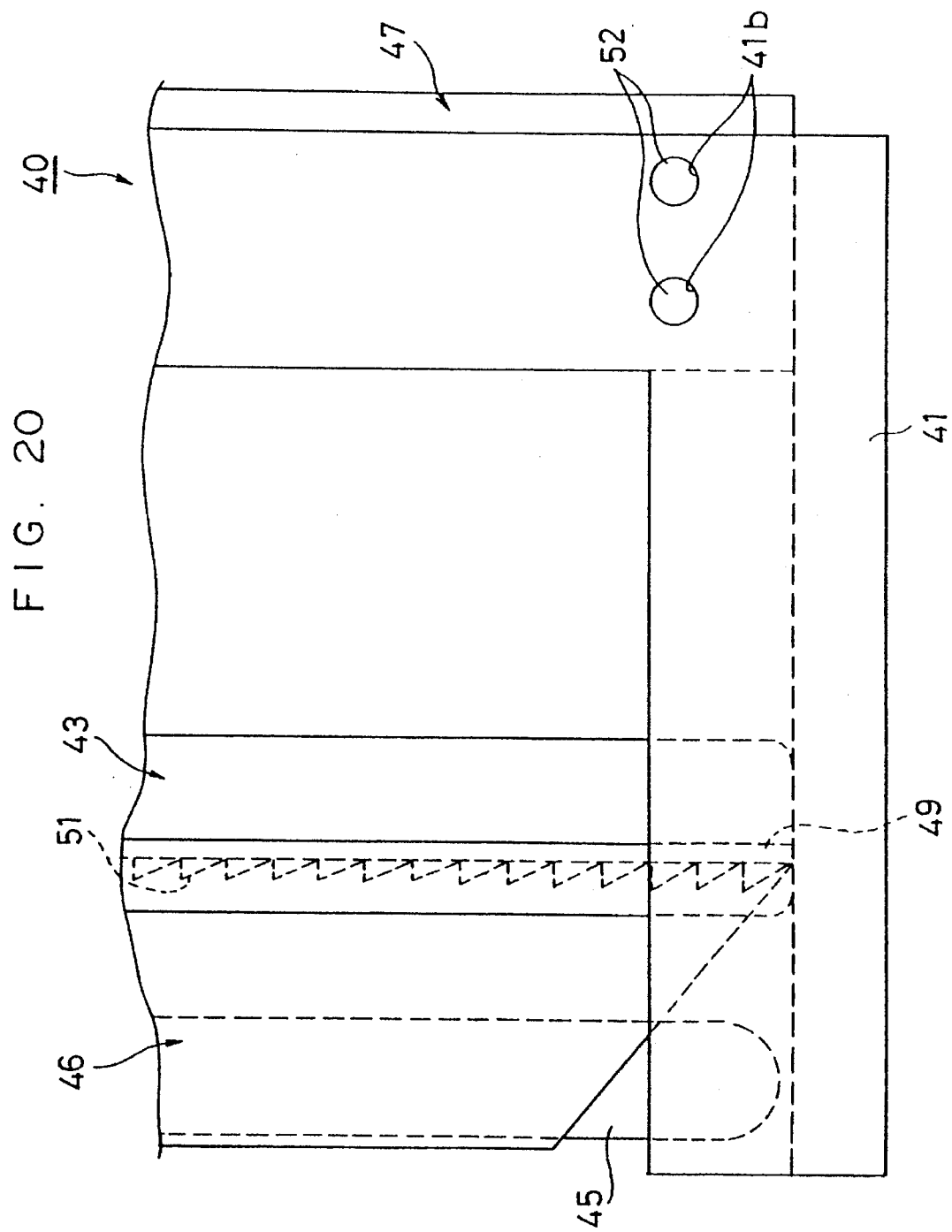
FIG. 20 is a partial plan view of the strobe device shown in FIG. 19.
Figure 21:
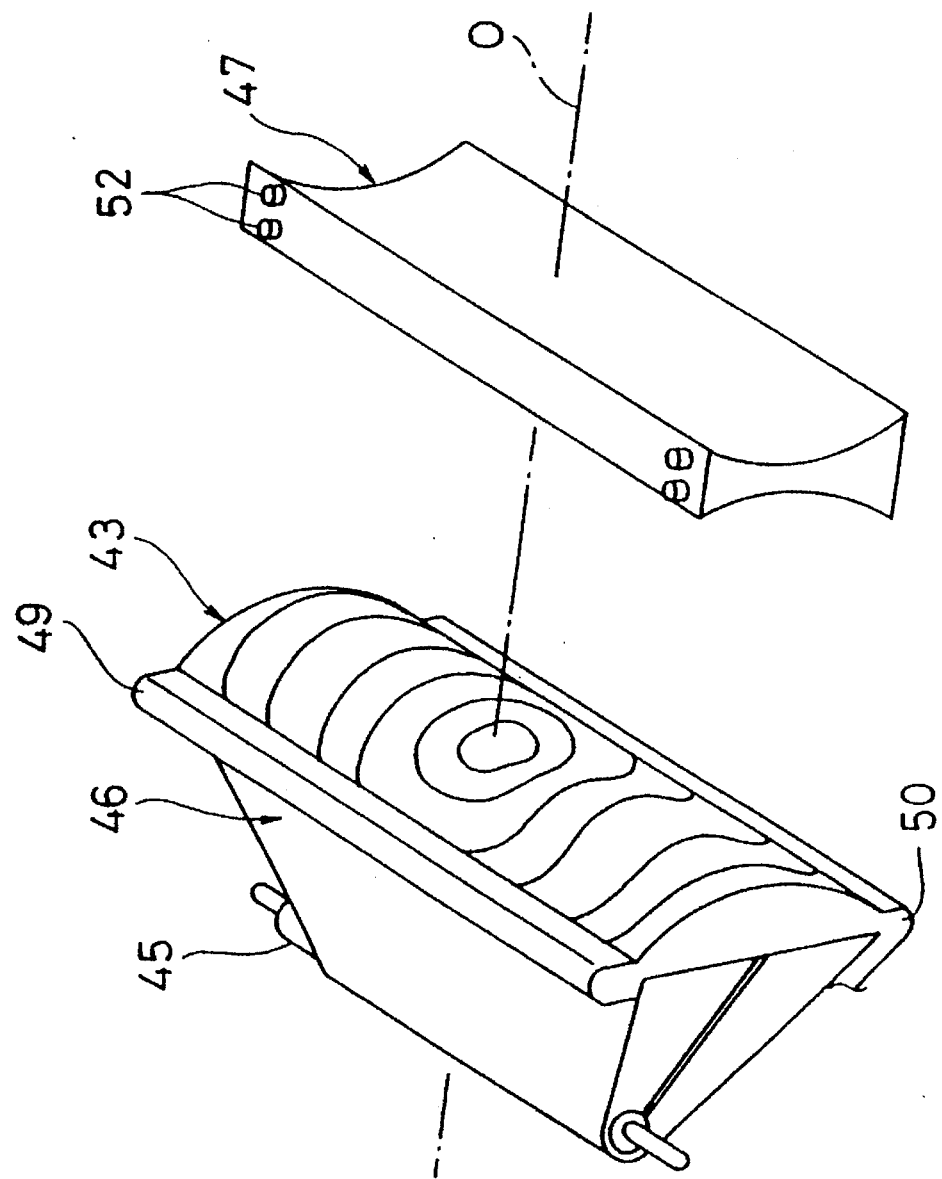
FIG. 21 is a partial perspective view of the strobe device shown in FIG. 19.

FIGS. 19, 20 and 21 show a strobe device 40 having a variable illumination angle, according to an eleventh embodiment of the present invention, in which useless light is not emitted at either the wide-extremity position nor the tele-extremity position upon variation of the illumination angle, so that uniform luminance distribution can be obtained. The strobe device 40 includes substantially identical upper and lower guide plates 41 and 42 secured to the strobe body. The upper and lower guide plates 41 and 42 are provided on opposite surfaces thereof with slide guide grooves 41a and 42a extending in the longitudinal direction thereof.

A first positive lens 43 made integral with the light emitting tube 45 is provided between the upper and lower guide plates 41 and 42. The first positive lens 43 is provided with guide projections 49 and 50 integral therewith, that are slidably inserted in the slide guide grooves 41a and 42a, so that the first positive lens 43 can be moved in the optical axis direction O together with the light emitting tube 45.

The first lens 43 is provided on the first lens surface 43a thereof with a convex Fresnel lens 51. The convex Fresnel lens 51 contributes to a reduction of the thickness and weight of the first lens 43. The second lens surface 43b of the first lens 43 is made of a cylindrical lens having a positive power in a direction normal to the optical axis O.

The light emitting tube 45 is provided in a reflector 46 which is located adjacent to the light emitting tube 45 to reflect light emitted therefrom. The reflector 46 is placed behind the light emitting tube 45 and has an arch-shaped reflecting surface 46a whose curvature corresponds to that of the light emitting tube 45 and a straight reflecting surfaces 46b which extend along the tangential planes of the light emitting tube 45 and which are connected to the arch-shaped reflecting surface 46a.

The upper and lower guide plates 41 and 42 define at the front ends thereof an opening 48 in which a second negative lens 47 is provided. The second lens 47 is integrally provided on the upper and lower surfaces thereof with right and left positioning projections 52 and 53 which are fitted in corresponding holes 41b and 42b formed in the upper and lower guide plates 41 and 42. The third lens surface 47a of the second lens 47 is shaped to be similar to the second lens surface 43b of the first lens 43. Namely, the third lens surface 47a of the second lens 47 and the second lens surface 43b of the first lens 43 are analogous to each other, so that the second lens surface 43b can be received in the third lens surface 47a. Note that numeral 47b designates a fourth lens surface of the second lens 47.

In the strobe device 40 having a variable illumination angle, as constructed above, when the first lens 43 and the light emitting tube 45 are manually moved or mechanically moved by a driving mechanism (not shown) through the guide projections 49 and 50 in the optical axis direction, an illumination angle of a bundle of light emitted from the light emitting tube 45 and transmitted through the first lens 43 is varied in accordance with the distance between the first lens 43 and the second lens 47.

Strobe devices 40 having different characteristics depending on the optical properties of the first lens 43 and the second lens 47 and the position of the light emitting tube 45 can be obtained, as will be discussed below.

Figure 22:
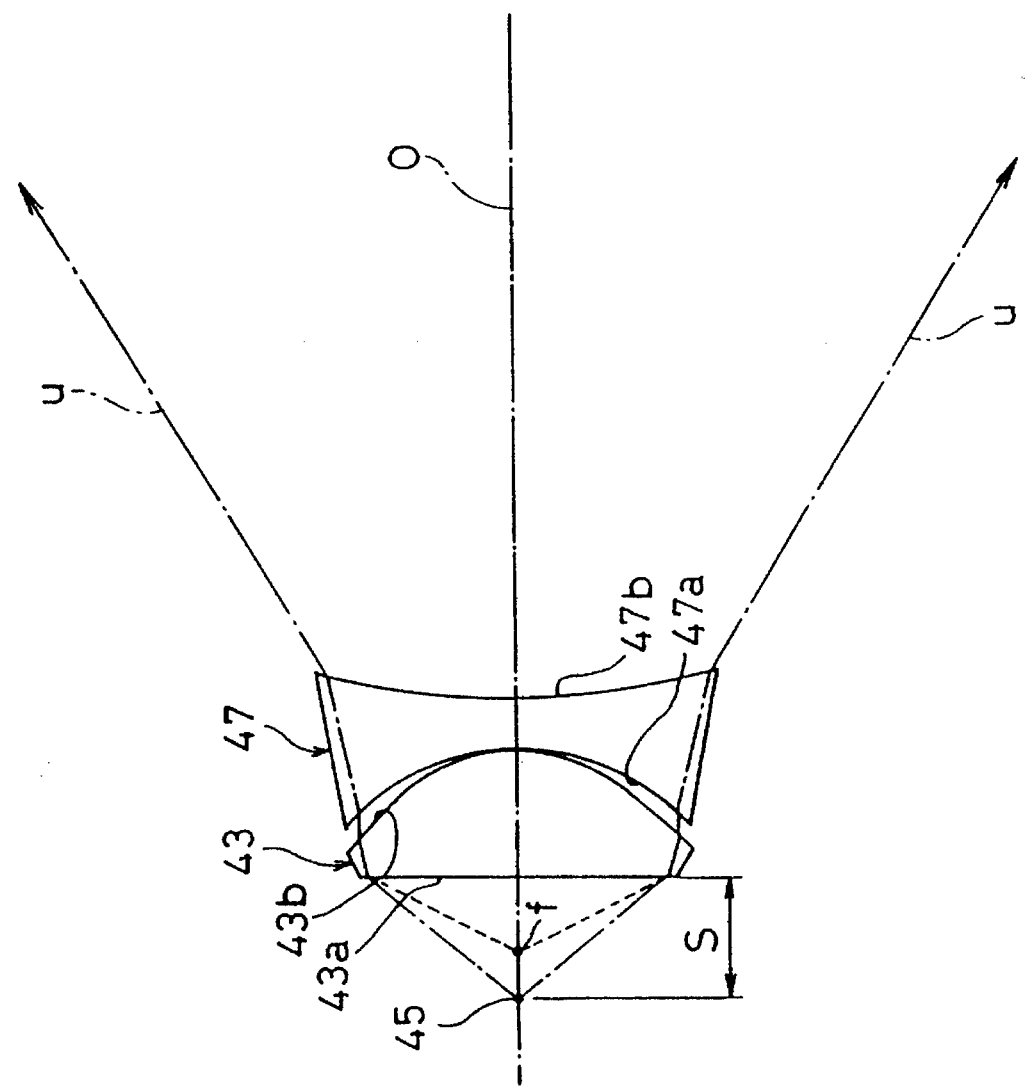
FIG. 22 is a side elevation view of Example 1 of a strobe device having first and second lenses at a wide-angle extremity, according to the eleventh embodiment of the present invention.
Figure 23:
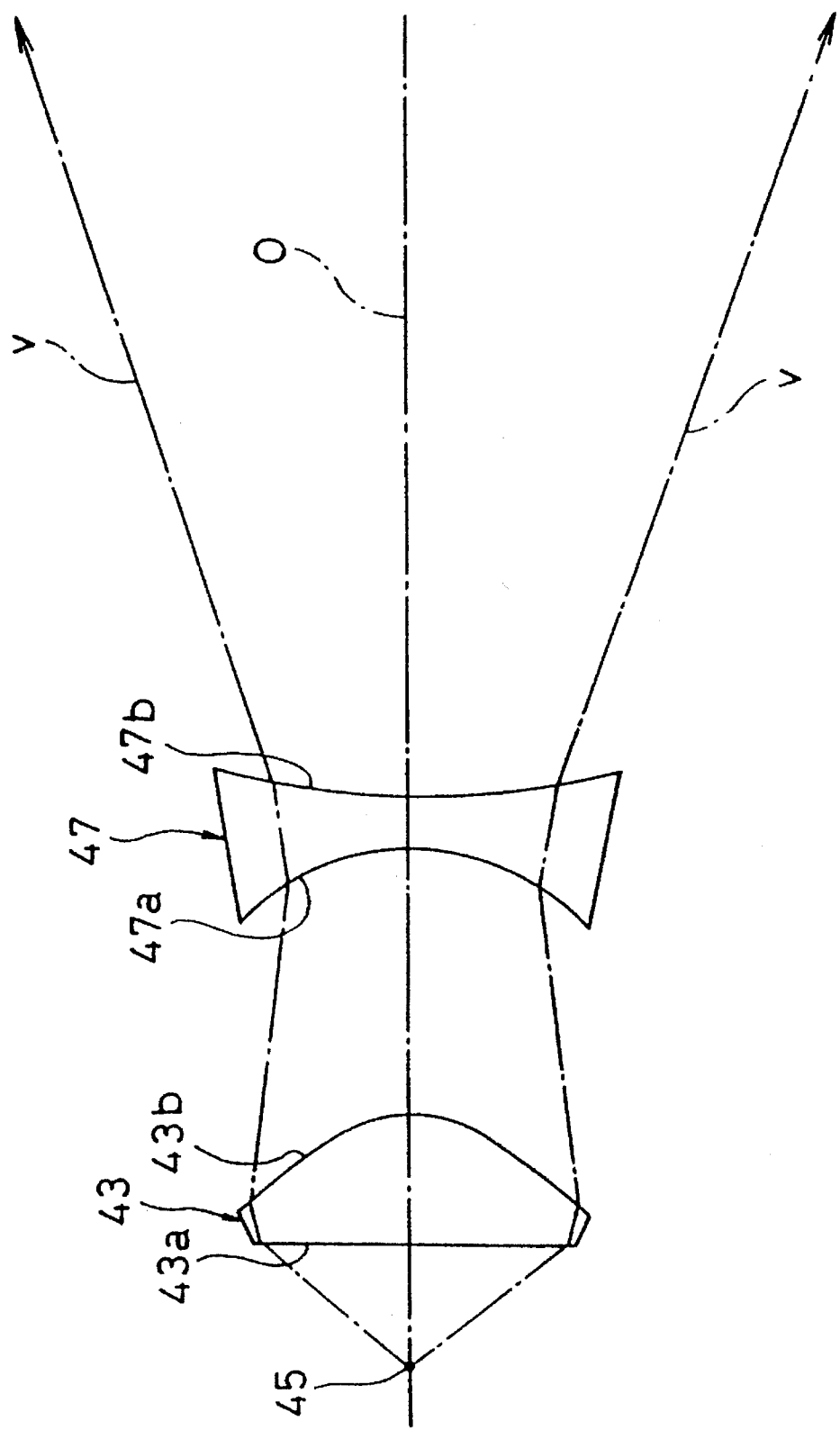
FIG. 23 is a side elevation view of Example 1 of a strobe device having first and second lenses at a telephoto extremity, according to the eleventh embodiment of the present invention.

Particulars of the first lens 43 and the second lens 47, in Example 1 shown in FIGS. 22 and 23 are shown in Tables 1 and 2 below.

TABLE 1

| First lens 43 | R | d | Nd | ν d |
|---|---|---|---|---|
| 1st surface 43a | 4 mm<br>(k = −4.0) | 4 mm | 1.49 | 57.8 |
| 2nd surface 43b | −4 mm<br>(k = −1.6) | | | |

R=radius of curvature in the vicinity of the optical axis;
d=distance between 1st and 2nd surfaces 43a and 43b along the optical axis;
Nd=refractive index of D-lines;
νd=abbe number of D-lines;

TABLE 2

| Second lens 47 | R | d | Nd | ν d |
|---|---|---|---|---|
| 3rd surface 47a | −8 mm | 2 mm | 1.59 | 29.9 |
| 4th surface 47b | 50 mm | | | | d=distance between 3rd and 4th surfaces 47a and 47b along the optical axis The first surface 43a is defined by an aspheric Fresnel lens having a convex surface towards the light emitting tube. The second surface 43b is also defined by an aspheric lens and is similar in shape to the spherical third surface 47a, so that the second surface 43b can be received in the third surface 47a. Namely, assuming that the degree of concavity of the third surface 47a in the optical axis direction is identical to the degree of convexity of the second surface 43b in the optical axis direction on the optical axis O, the difference between the values of the degree of convexity and the degree of concavity increases toward the circumferential portions of the lenses. Namely, the difference between the degree of concavity and the degree of convexity is not a negative value. Consequently, when the first lens 43 comes close to the second lens 47, the thickness of the second surface 43b is absorbed in the concavity of the third surface 47a, so that the displacement of the first lens 43 on the optical axis O can be increased. This results in an increase in the variable range of the illumination angle, thus leading to a miniaturization of the strobe device. Note that "k" in Tables 1 and 2 above designates the cone coefficient. The distance X of the apex of the aspheric surface at a point spaced from the optical axis O by a height Y from a tangential plane is given by;

$$X=CY^2/[1+\{1-(1+k)C^2Y^2\}^{1/2}]$$

wherein C designates curvature (1/r) at the apex of the aspheric surface.

In Example 1 mentioned above, using the first lens 43 and the second lens 47, the distance D (e.g., D=4.6 mm) between the light emitting point of the light emitting tube 41 and the first lens 43 is larger than the focal length f of the first lens 43 (f<D), the light emitted from the first lens 43 is convergent light. Consequently, the light emitted from the first lens 43 is made on a substantial part of the second lens 47 when the first lens 43 is close to the second lens 47. The beam "u" farthest from the optical axis O passes through the end of the second lens 47 and is diverged due to a relatively strong negative power of the second lens 47 to increase the illumination angle thereof. This corresponds to a wide-angle position.

Conversely, when the first lens 43 is moved away from the second lens 47, light from the first lens 43 is incident only on the center portion of the second lens 47 and in the vicinity thereof, so that the light is subject to a relatively weak negative power of the second lens 47. As a result, the illumination angle is reduced as shown at "v" in FIG. 23. This corresponds to a telephoto position. Thus, a strobe device 40 having a variable illumination angle and a high light utilization efficiency can be provided.

As is well known, a chromatic aberration tends to occur in a lens having a strong power. Nevertheless, in the Example 1 mentioned above, since the Abbe number vd of the second negative lens 47 is small, the occurrence of the chromatic aberration upon illumination is prevented.

Figure 24:
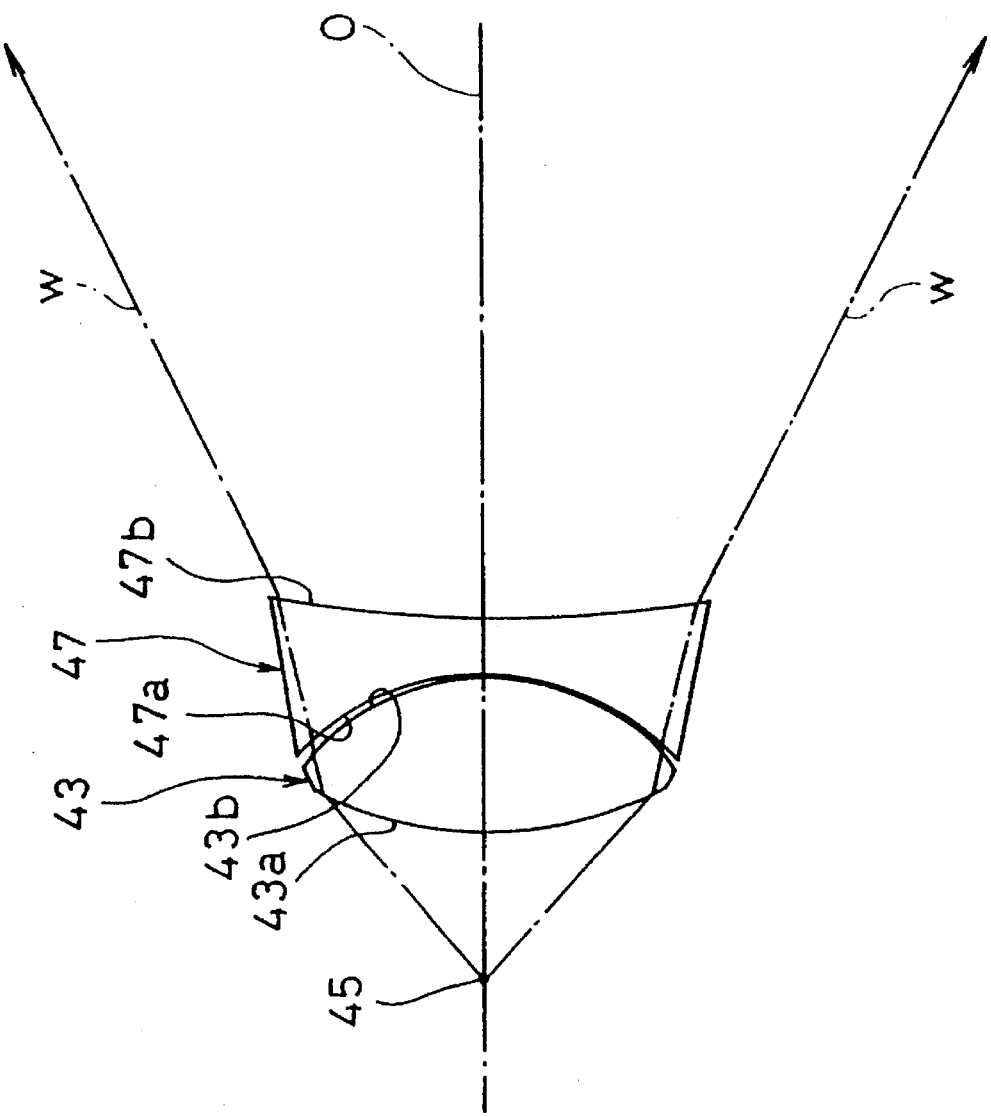
FIG. 24 is a side elevation view of Example 2 of a strobe device having first and second lenses at a wide-angle extremity, according to the eleventh embodiment of the present invention.

In Example 1 in which the diameter Φ of the light emitting tube 41 is 2.5 mm (Φ=2.5 mm), the distance D is 4.6 mm (D=4.6 mm), the angle defined by the straight reflecting surface 46b and the line perpendicular to the optical axis O is 50°, a strobe device 40 having a variable illumination angle, suitable for a camera using a 35 mm film (Lieca format) and a variable focal length range of 35 mm to 80 mm can be obtained. In Example 2 shown in FIG. 24, particulars of the first lens 43 and the second lens 47 are as follows.

TABLE 3

| First lens 43 | R | d | Nd | v d |
|---|---|---|---|---|
| 1st surface 43a | 4 mm (k = −5.0) | 6 mm | 1.49 | 57.8 |
| 2nd surface 43b | −6 mm (k = −1.1) | | | |

TABLE 4

| Second lens 47 | R | d | Nd | v d |
|---|---|---|---|---|
| 3rd surface 47a | −8 mm | 2 mm | 1.49 | 57.8 |
| 4th surface 47b | 50 mm | | | |

Since the aspherical third surface 47a is similar in shape to the second surface 43b, the first lens 43b can be received in the third surface 47a when the first lens 43 comes close to the second lens 47. This makes it possible to realize a compact strobe device, similar to the Example 1 mentioned above.

In Example 2, the first surface 43a is not a Fresnel lens, and accordingly, a higher utilization efficiency of light than that in Example 1 can be obtained. Namely, as is well known, in the Fresnel lens, vignetting occurs due to the serrated lens surface thereof. To prevent vignetting, the first lens surface 43a is not provided with the Fresnel lens to increase the light utilization efficiency.

Figure 25:
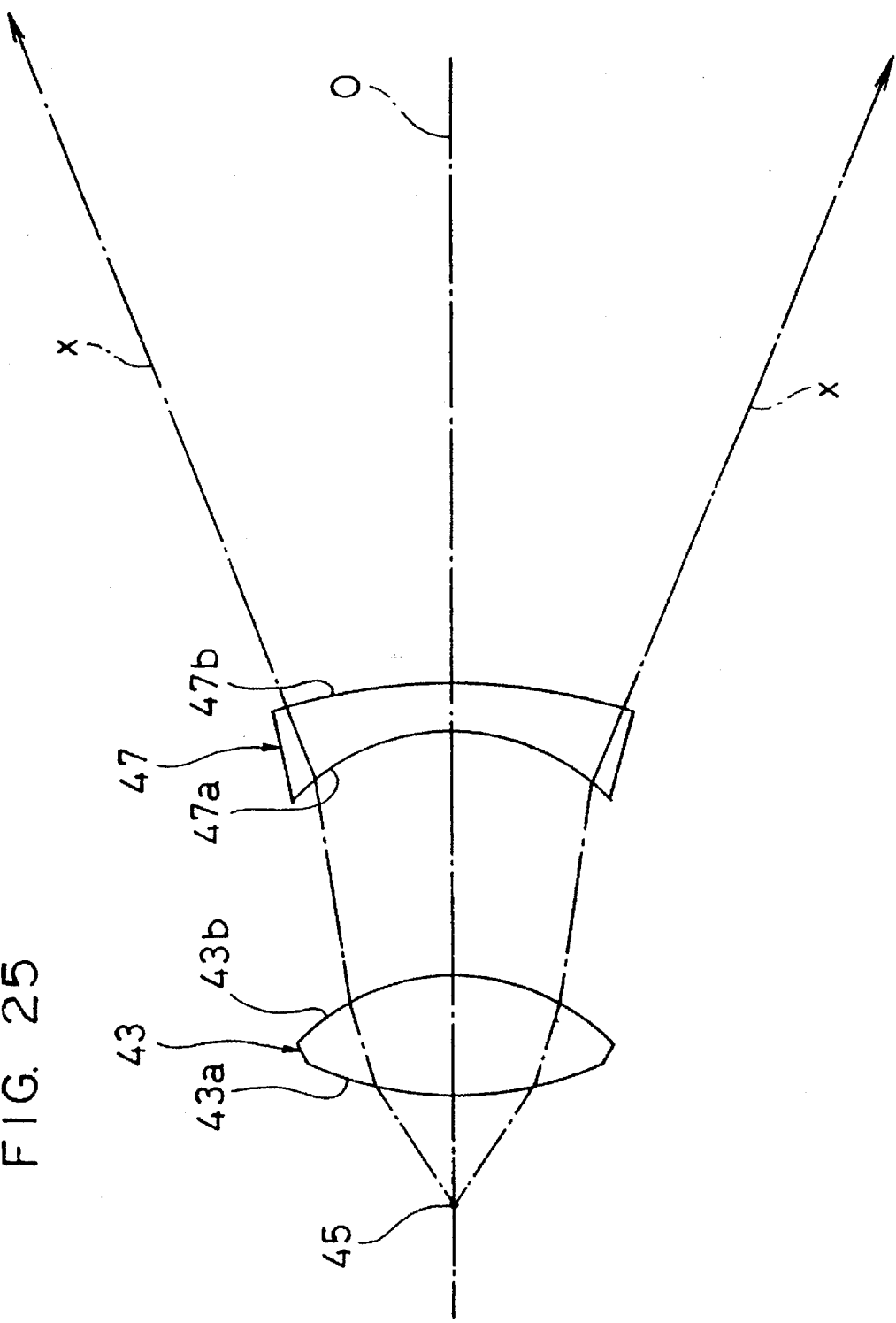
FIG. 25 is a side elevation view of Example 3 of a strobe device having first and second lenses at a telephoto extremity, according to the eleventh embodiment of the present invention.

In Example 3 shown in FIG. 25, particulars of the first lens 43 and the second lens 47 are as follows.

TABLE 5

| First lens 43 | R | d | Nd | v d |
|---|---|---|---|---|
| 1st surface 43a | 15 mm | 5 mm | 1.49 | 57.8 |
| 2nd surface 43b | −8 mm | | | |

TABLE 6

| Second lens 47 | R | d | Nd | v d |
|---|---|---|---|---|
| 3rd surface 47a | 8 mm | 2 mm | 1.49 | 57.8 |
| 4th surface 47b | 20 mm | | | |

In Example 3, the first surface 43a is not a Fresnel lens, similar to Example 2, and the third surface 47a is similar in shape to the second surface 43b. Consequently, the thickness of the first lens 43b can be entirely received in the third surface 47a when the first lens 43 comes close to the second lens 47, thus resulting in a compact strobe device.

In Example 3, the distance D between the light emitting point of the light emitting tube 41 and the first lens 43 is 4.6 mm which is smaller than the focal length f (f>D). Accordingly, the change of the illumination angle caused by the movement of the first lens 43 relative to the second lens 47 is opposite that in Examples 1 and 2 mentioned above. Namely, in Example 3, when the first lens 43 comes close to the second lens 47, the illumination angle is reduced and corresponds to the telephoto position. Conversely, when the first lens 43 comes away from the second lens 47, the illumination angle is increased as indicated at "x" in FIG. 25 and corresponds to the wide-angle position. Consequently, a strobe device having a variable illumination angle can be realized, wherein an enhanced light utilization efficiency is obtained in both the wide-angle position and the telephoto position. If the same reflector as that in Example 1 is attached to the strobe device 40, the illumination angles corresponding to the focal lengths of 40 mm to 80 mm can be obtained.

In the strobe device 40, as constructed above, the illumination angle can be manually varied or mechanically varied by a driving mechanism. It is also possible to vary the illumination angle in association with the change in focal length of an associated camera. The association of the strobe device 40 with the change in the focal length can be carried out by a device for transmitting the movement of the movable lens barrel of the camera to the guide projections 49 and 50 of the first lens 43 through a gear train or a cam mechanism.

As can be seen from the above discussion, substantially no useless light is emitted from the strobe device 40 in the wide-angle position and the telephoto position, thus resulting in a simple and inexpensive strobe having an improved light distribution.

The following discussion will be directed to a twelfth embodiment of the present invention (as shown, for example, in FIGS. 26 through 33).

In the conventional strobe device having a variable illumination angle, the illumination angle (angle of view) is varied by controlling the distance between the light emitting tube (and the reflecting mirror) and the condenser lens. Accordingly, it is necessary to continuously move the condenser lens in the optical axis direction in accordance with the change in focal length of the zoom lens. However, to permit the condenser lens to move in the axial direction, there is a large axial space in the camera, preventing the realization of a small and compact camera.

The twelfth embodiment of the present invention is aimed at an elimination of the above-mentioned problem of the conventional strobe device, while retaining the technical effect of an improvement in light quantity distribution.

Figure 33:
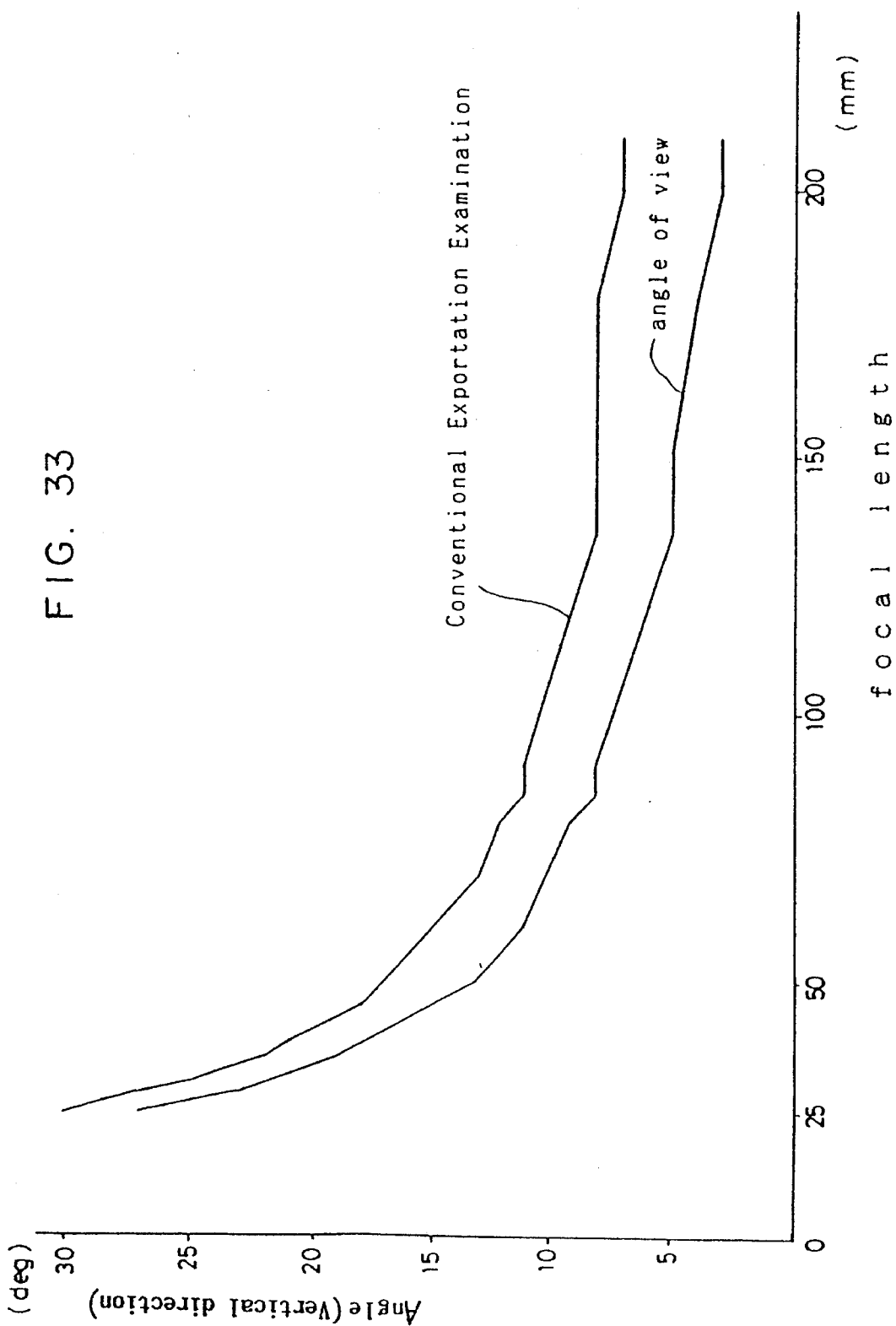
FIG. 33 is a diagram showing a relationship between a focal length and an angle of coverage of a zoom lens of a camera in which the strobe device shown in FIG. 32 can be incorporated.

Namely, the inventors of the present invention have conceived that it is not always necessary to continuously vary the illumination angle of the strobe. Namely, the inventors have found that the intended function can be achieved by a discontinuous change of the illumination angle. As can be seen in FIG. 33, which shows a relationship between the focal length and the angle of view in a camera for a 35 mm film (Leica format), there is a steep change of the angle of view in accordance with the focal length on the wide-angle side, but the change of the angle of view depending on the focal length is very small on the telephoto side.

Furthermore, it is not necessary to make the angle of view coincidental with the illumination angle of the strobe device. The necessary requirement is only that the angle of view is always smaller than the illumination angle of the strobe device, in view of a parallax depending on the positions of the zoom lens and the strobe device.

In the twelfth embodiment conceived based on this analysis, no reduction of the light utilization efficiency takes place at the telephoto position in which the condenser lens is moved away from the reflecting mirror; thus, resulting in an increase in the guide number. Consequently, it is neither necessary to use a large condenser lens in order to effectively gather light when the condenser lens is moved away from the reflecting mirror, nor is it necessary to provide a large space in which the axial displacement of the condenser lens takes place in accordance with the change in the focal length of the zoom lens. This makes it possible to produce a small and simple strobe device according to the present invention.

The twelfth embodiment will be described below in more detail with reference to FIGS. 26 through 32.

The twelfth embodiment is characterized in that the lens member is moved, in accordance with the focal length of the zoom lens, in front of the reflecting mirror which reflects light emitted from the light source to discontinuously vary the illumination angle of the strobe.

The reflecting mirror 57 corresponds to the reflecting mirror 12 having two straight reflecting surfaces 12a incorporated in the strobe device according to the first embodiment discussed hereinbefore.

The reflecting mirror 57 includes a first reflecting surface 58 and second reflecting surfaces 57a connected to the first reflecting surface 58. The second reflecting surfaces 57a are made of a pair of upper and lower flat plates (straight plates) located on opposite sides of a cylindrical light emitting tube 56. The latter is received in a recess 100 provided at the rear end of the reflecting mirror 57 on the optical axis O. The recess 100 is defined by the first reflecting surface 58 which is in turn defined by an arch-shaped reflecting surface whose curvature corresponds to that of the light emitting tube 56. The second reflecting surfaces 57a are defined by tangential planes of the light emitting tube 56. The second reflecting surfaces 57a can be made of completely straight plates or slightly elliptical plates whose curvature is considerably larger than the curvatures of conventional elliptical mirrors.

Figure 29:
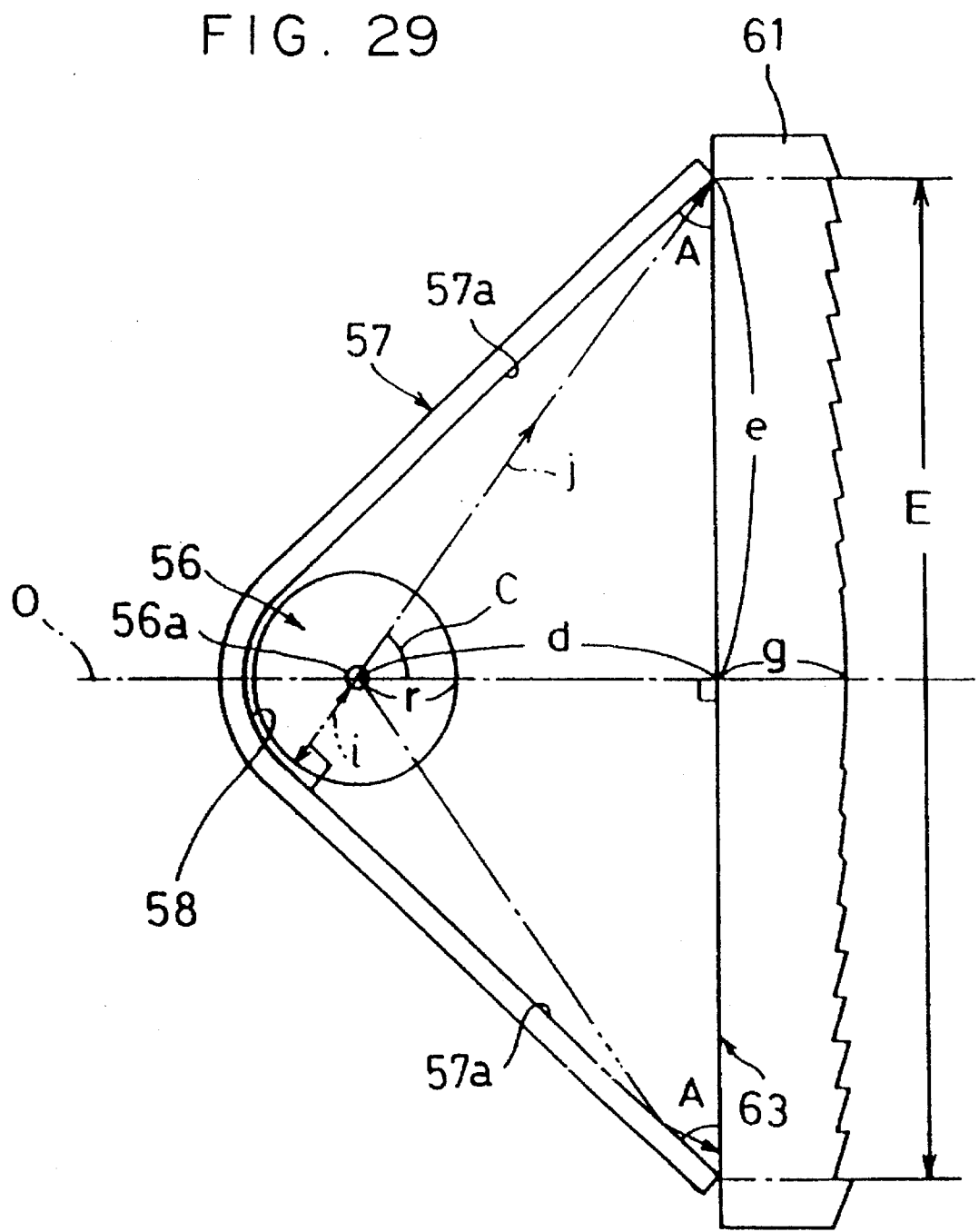
FIG. 29 is a side elevation view of a reflector incorporated in the strobe device shown in FIG. 26.

The beams of light emitted from the light emitting point 56a of the light emitting tube 56 and reflected by the upper second reflecting surface 57a in FIG. 29 are emitted as indicated at "p" in FIG. 1. On the other hand, the beams emitted from the light emitting point 56a of the light emitting tube 56 and reflected by the lower second reflecting surface 57a pass as indicated at "q" in FIG. 1.

It is deemed that there are equivalently two virtual images of the light emitting point 56a of the light emitting tube 11 at upper and lower points "a" (FIG. 1) which are optically conjugate with the light emitting point 56a with respect to the respective upper and lower second reflecting surfaces 57a. Namely, rays of light are emitted from the strobe device as if there were light emitting tubes having light emitting points located on the points "a". No formation of images of the rays of light "p" and "q" takes place after they are transmitted through the Fresnel lens 61. Namely, the rays of light "p" and "q" are oriented in the substantially same directions. Accordingly, there is substantially no irregularity in the quantity of light, particularly at the center of the bundle of light.

The bundle of light emitted outward from the Fresnel lens 61 includes light (direct light) directly emitted in the forward direction (right direction in FIG. 29) from the light emitting tube 56 without being reflected by the second reflecting surfaces 57a, in addition to light (reflected light) reflected from the upper and lower second reflecting surfaces 57a. In addition, light emitted in the opposite direction (left direction in FIG. 29) from the light emitting tube 56 is reflected by the first reflecting surface 58 and is emitted outward (forward) from the Fresnel lens 61 together with the direct light and the reflected light.

In the reflecting mirror 57 as constructed above, no real image of the light emitting tube 56 is formed by the second reflecting surfaces 57a. Instead, virtual images thereof are formed behind the second reflecting surfaces 57a. Consequently, the direct light from the light emitting tube and the reflected light reflected from the reflecting mirror 57 are emitted in the substantially same directions, thus resulting in a high light utilization efficiency and an improved distribution of the quantity of light. Consequently, the guide number which is defined by the quantity of light at the center portion of the distribution can be increased.

Figure 28:
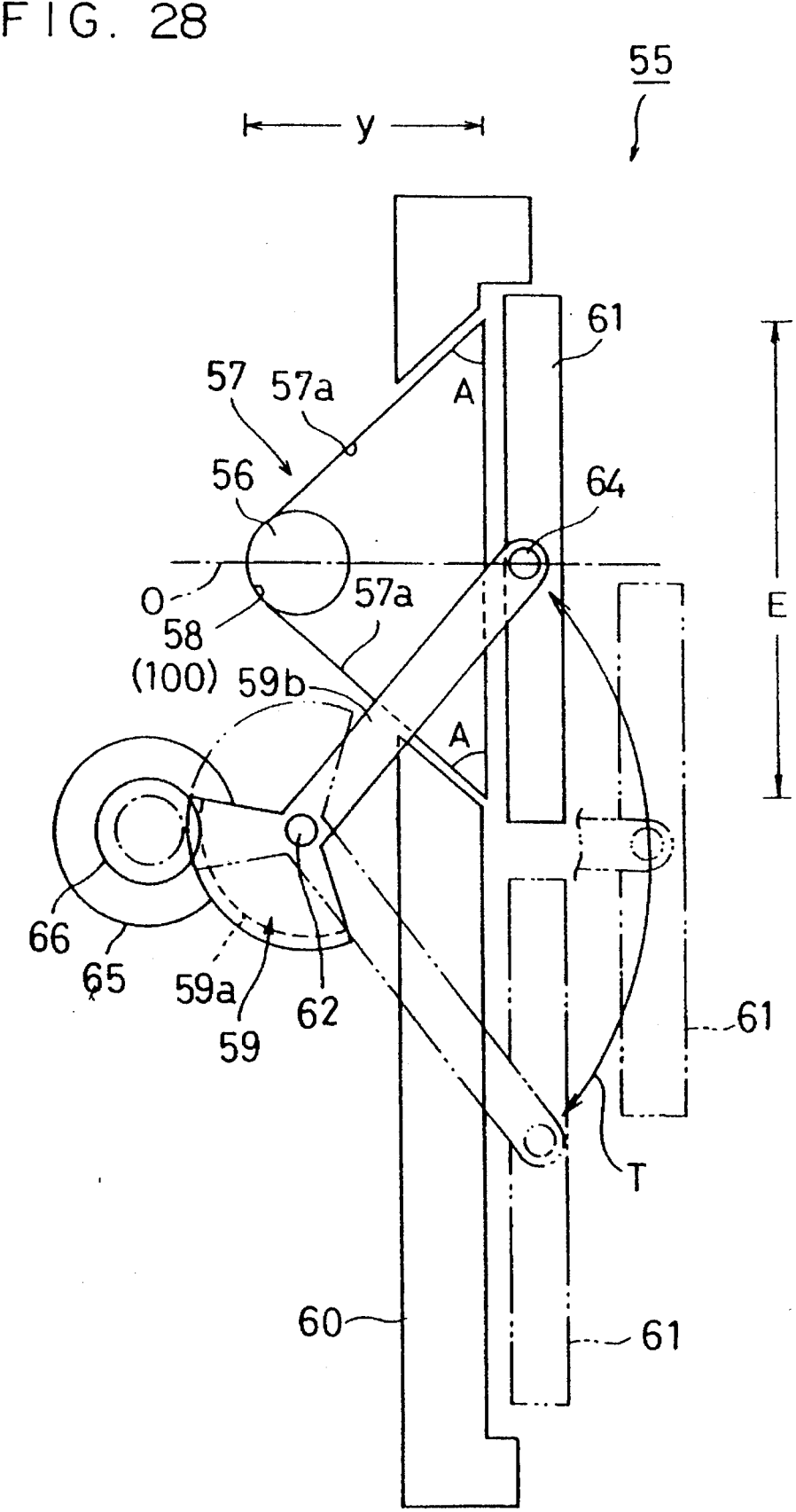
FIG. 28 is a side elevation view of the strobe device shown in FIG. 26.

A strobe device 55 in which the reflecting mirror 57 as constructed above is incorporated will be discussed below. The reflecting mirror 57 is supported by a support 60, as shown in FIG. 28. The strobe device 55 includes a Fresnel lens 61 (lens member) which has a positive power and is capable of moving between an advanced position in which the Fresnel lens 61 is located in front of the reflecting mirror 57, and a retracted position in which the Fresnel lens 61 is retracted from the reflecting mirror 57. The light emitting tube 56 is made of, for example, a xenon tube which has an longitudinal axis extending in the direction perpendicular to the sheet of the drawing (FIG. 28).

A rotary supporting member 59 having a sector gear 59a and a supporting arm 59b is provided behind the support 60. The supporting arm 59b is pivoted at its base end to an immovable portion (not shown) of the strobe device through a pivot shaft 62. The supporting arm 59b is rotatably connected at the other end thereof to the Fresnel lens 61 through a pivot shaft 64. Adjacent to the sector gear 59a is provided a strobe motor 65 having a pinion 66 which is secured to a drive shaft of the strobe motor 65, so that the sector gear 59a is in mesh with the pinion 66. The supporting arm 59b is rotated about the pivot shaft 62 by the strobe motor 65 to move the Fresnel lens 61 along a circular locus indicated by an arrow T in FIG. 28, between the advanced position corresponding to the telephoto position and the retracted position corresponding to the wide-angle position.

Figure 26:
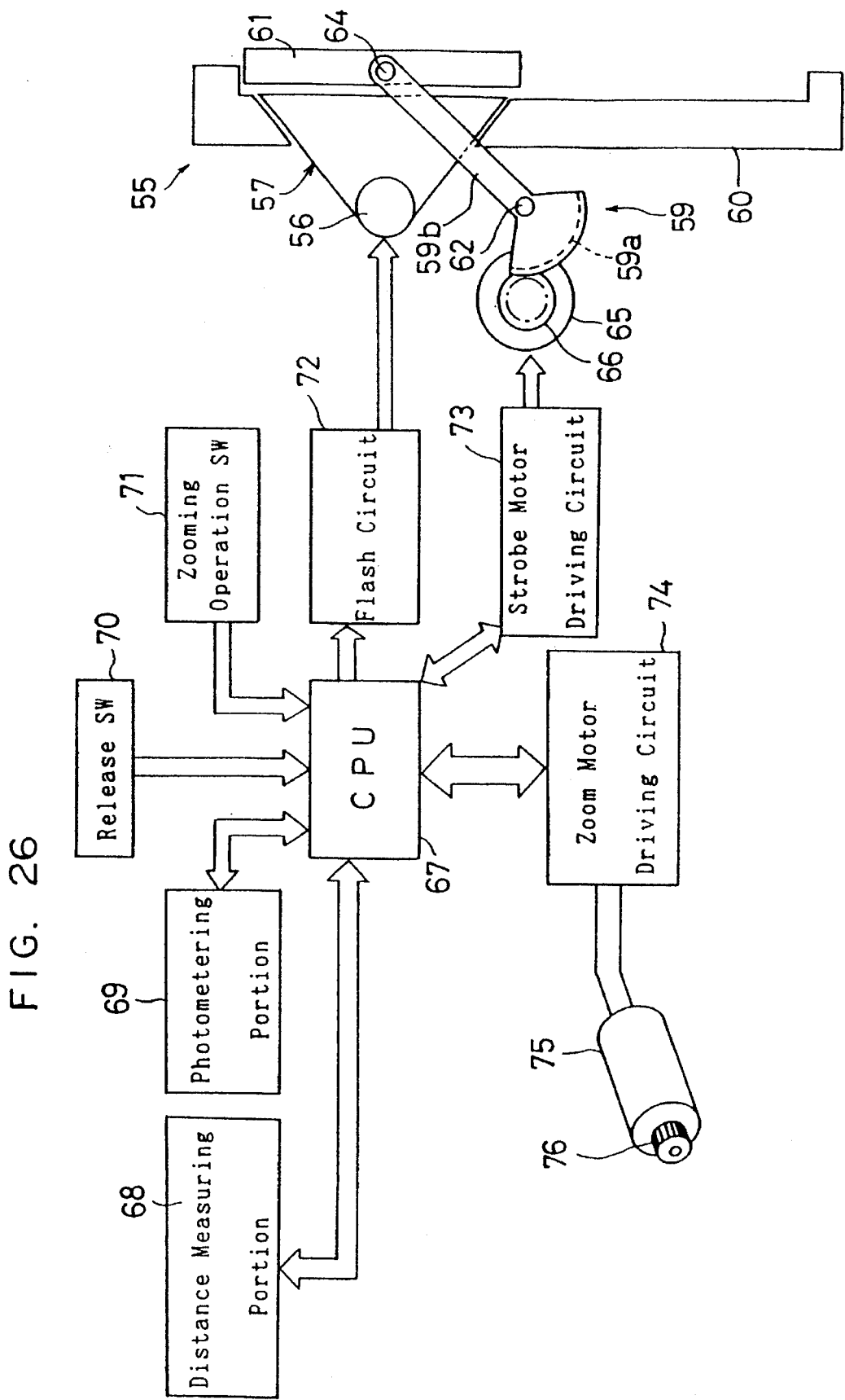
FIG. 26 is a block diagram of a control system of a camera and a strobe device according to an twelfth embodiment of the present invention.
Figure 27:
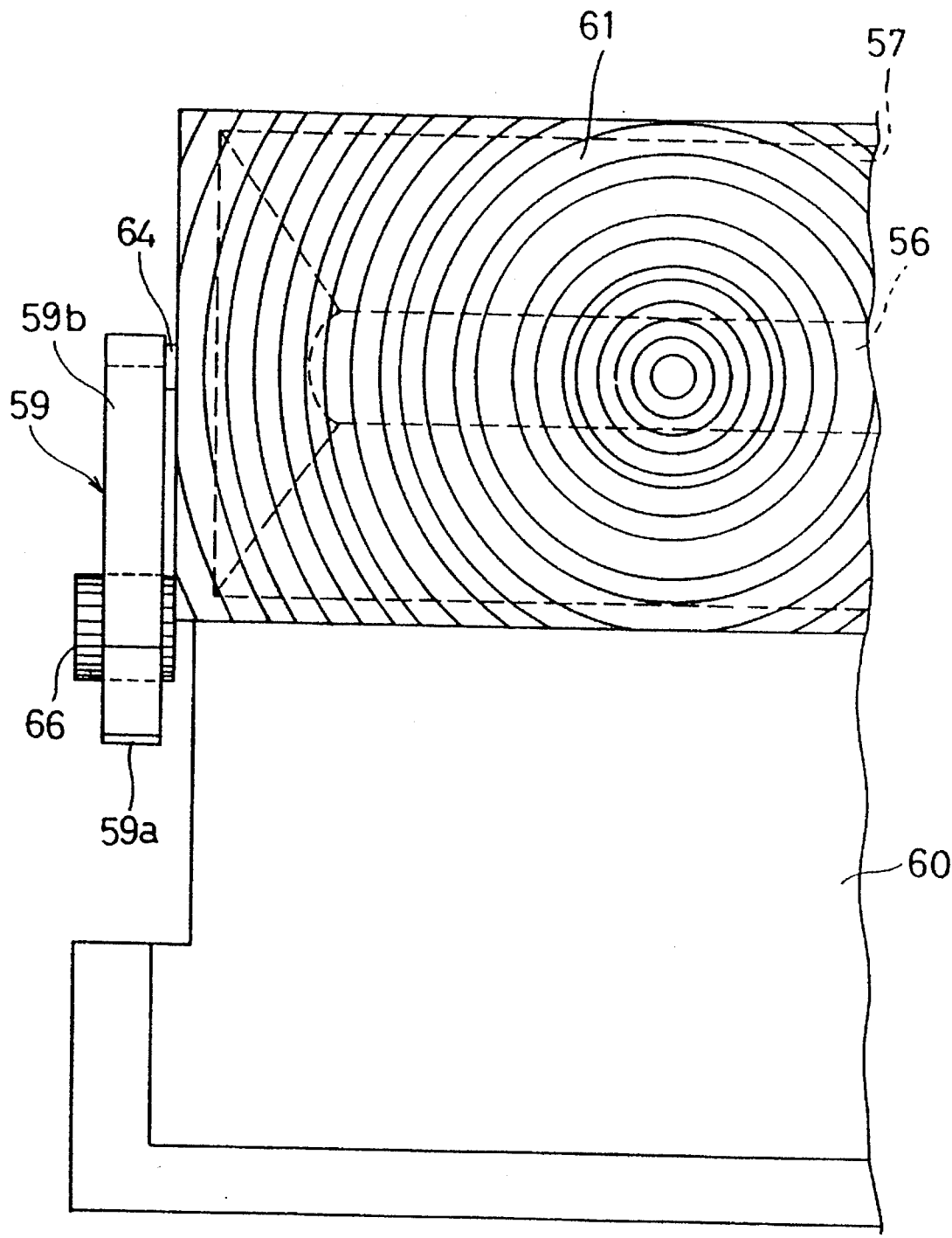
FIG. 27 is a partially broken side elevation view of the strobe device shown in FIG. 26.
Figure 30:
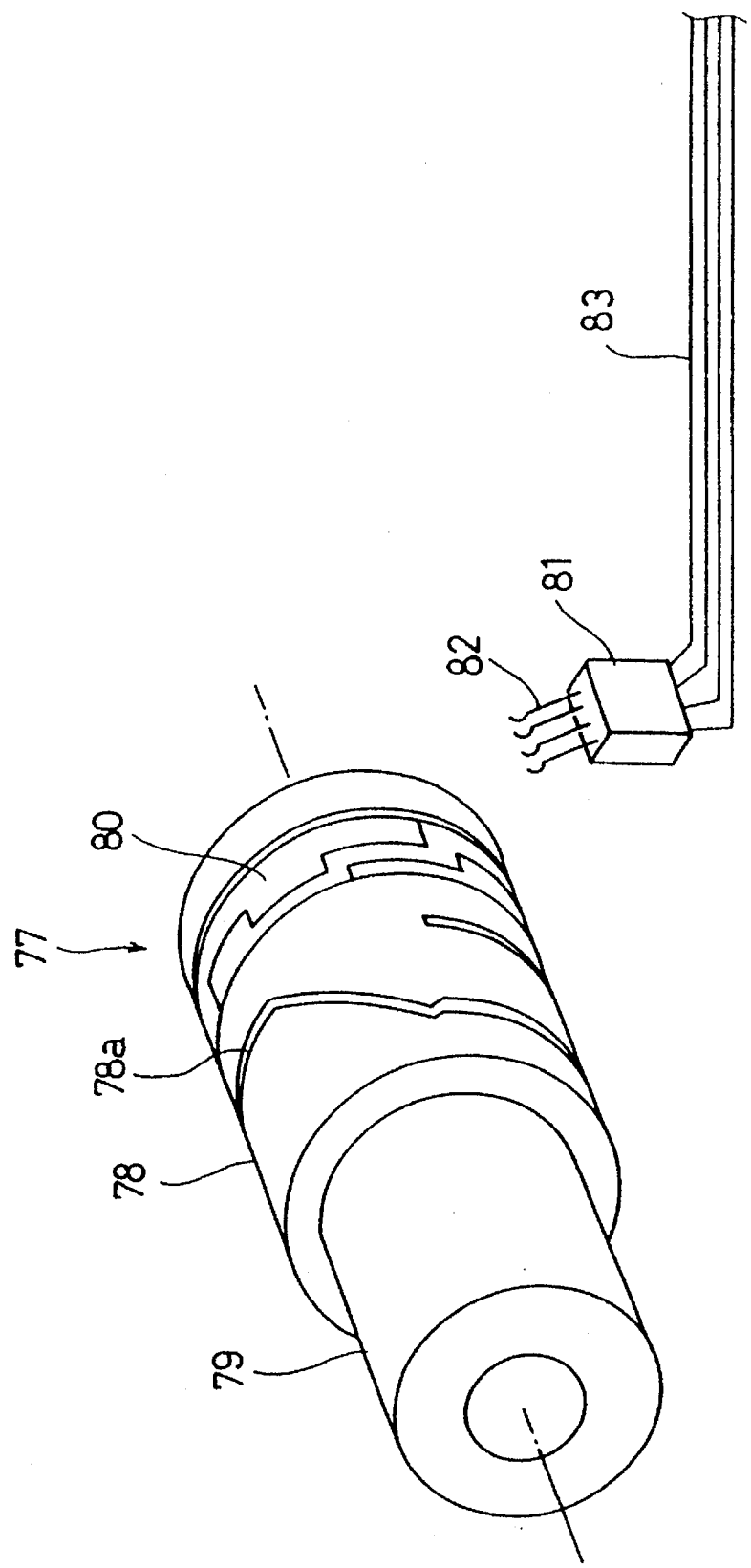
FIG. 30 is a perspective view of zoom lens and brush of a camera to which the strobe device shown in FIG. 26 may be attached.

FIG. 26 shows a block diagram of a controller which controls the strobe device 55 incorporated in a camera (not shown) having a zoom lens 77 (see FIG. 30). The controller includes a CPU 67 to which an object distance measuring portion 68 that calculates distance data in accordance with measurements detected by an object distance sensor not shown, a photometering portion 69 that calculates photometering data in accordance with the distance data, and a release switch 70 that is turned ON to actuate a shutter of the camera are connected. In addition, a zooming operation switch 71 which drives the zoom lens 77 to effect zooming of the lens, a flash circuit 72 which outputs light emission signals to the light emitting tube 56, a strobe motor driving circuit 73 which drives the strobe motor 65, and a zoom motor driving circuit 74 which drives the zoom motor 75 for driving the zoom lens, are connected to the CPU 67. Note that numeral 76 designates the pinion secured to the drive shaft of the zoom motor 75.

In FIG. 30, the zoom lens 77 includes a cam ring 78 having a cam groove 78a, and a movable lens barrel 79 which is moved in the optical axis direction in accordance with the rotation of the cam ring 78. The cam ring 78 is provided on the outer peripheral surface thereof with a zoom code plate 80, with which zoom brushes 82 provided on the camera body selectively come into slide-contact to detect the focal length of the zoom lens 77. Focal length data which is read by the brushes 82, which come into slide-contact with the zoom code plate 80 that is rotated together with the cam ring 78 when the zoom lens 77 is driven, is sent to the CPU 67 through signal lines 83 connected to a brush body 81 of the zoom brushes 82.

With reference to FIG. 29, the reflecting mirror 57 and the Fresnel lens 61 will be described below in more detail.

A pair of upper and lower reflecting plates 57a of the reflecting mirror 57 are made of straight and flat plates so as not to form a real image of the light emitting tube 56, unlike conventional elliptical mirrors which form a real image of the light emitting tube, and so as to form virtual images of the light emitting tube behind the reflecting plates 57a. The direct light and the reflected light reflected only once by the reflecting mirror are basically emitted within an illumination angle of C. The reflecting mirror 57 is associated with the Fresnel lens 61 located in front thereof so that light emitted from the opening 63 defined by the edges of the second reflecting surfaces 57a is distributed over an area defined approximately by ±30° in the vertical direction. The distribution area is defined by the guide number (GN) which is smaller by 1 EV than the guide number at the center of the distribution.

The reduced quantity of light X(EV) at the circumferential portion of the distribution area is given by;

$$X(EV)=\log(GN1/GN0)^2/\log 2$$

wherein GN1 designates the guide number at the circumferential portion of the distribution, and GN0 designates the guide number at the center portion of the distribution.

The reflecting mirror 57 is shaped so that the second reflecting surfaces 57a are connected at the front ends thereof to the Fresnel lens 61 at an angle "A"; and the beams "j" emitted from the light emitting point 56a at an illumination angle C concur with the beams "i" emitted from the light emitting point 56a in the opposite directions and reflected by the reflecting mirror 57.

The second reflecting surfaces 57a are shaped to satisfy the following equations (1) and (2):

$$\sin(A)\approx\{r+(r^2+8e^2)^{1/2}\}/4e \tag{1}$$

$$e\approx d\cdot\tan(A) \tag{2}$$

wherein "e" designates the half value of the width E of the opening 63 of the second reflecting surfaces 57a; "r" the radius of a circle in cross section of the light emitting tube 56; and "d" the distance between the light emitting point 56a of the light emitting tube 56 and the opening 63 along the illumination light axis O, respectively.

In an example, to satisfy the above-mentioned requirements, the length E of the opening 63 is 11 mm, the diameter of the light emitting tube 56 is 2.5 mm, the angle A=50°, and the distance d is 4.6 mm.

The Fresnel lens 61 is made of a positive lens of acrylic resin and has a refractive index n of about 1.5 (n=1.5), and a center thickness g of about 1.5 mm (g=1.5 mm). The rear surface (first surface) of the Fresnel lens 61 that faces the light emitting tube 56 has an infinite radius of curvature R (R=∞). The radius of curvature R and the cone coefficient k of the front surface (second surface) of the Fresnel lens 61 that faces an object to be photographed are 5 (R=5) and −2 (k=−2), respectively.

The operation of the strobe device 55 as constructed above is as follows.

When the zoom lens 77 is moved to the wide-angle position, the strobe motor 65 is rotated in one direction by the strobe motor driving circuit 73 in response to the control signal from the CPU 67, so that the rotary supporting member 59 is rotated in the clockwise direction in FIG. 28 by the pinion 66. As a result, the Fresnel lens 61 is moved to the retracted position in which the Fresnel lens 61 is retracted downward from the reflecting mirror 57, as shown at a phantom line in FIG. 28.

To emit strobe light from the strobe device upon the release of the shutter, when the release switch 70 is turned ON, the emission command signal is sent from the CPU 67 to the flash circuit 72. As a result, the flash circuit 72 causes the light emitting tube 56 of the strobe device 55 to emit light, so that the direct light and the reflected light are emitted over a wide illumination range (i.e., at a large illumination angle) corresponding to the wide-angle position. Since the second reflecting surfaces 57a are substantially straight and flat so that no real image of the light emitting tube 56 is formed, and instead, virtual images thereof are formed behind the second reflecting surfaces 57a, as mentioned above, the direct light from the light emitting tube 56 and the light reflected from the reflecting mirror 57 are emitted forward in substantially the same direction, thus resulting in a uniform light distribution. Furthermore, there is no reduction in the quantity of light to be utilized, and a large guide number can be obtained.

To move the zoom lens 77 from the wide-angle position to the telephoto position, the zooming operation switch 71 is actuated to drive the zoom motor 75 to thereby extend the zoom lens 77 in the optical axis direction, so that focal length data, which varies in accordance with the movement of the zoom lens 77, is read by the brushes 82 which come into slide-contact with the zoom code plate 80 and is input to the CPU 67. When the focal length data becomes a set value which can be optionally determined, for example, based on the relationship between the focal length and the angle of view as shown in FIG. 33, the CPU 67 outputs drive signals to the strobe motor driving circuit 73. In this embodiment, it is arranged such that the Fresnel lens 61 is inserted when the focal length of the zoom lens is over 50 mm. As a result, the strobe motor 65 is reversed by the strobe motor driving circuit 73 to rotate the rotary supporting member 59 in the counterclockwise direction in FIG. 28, so that the Fresnel lens 61 is moved to the advanced position in which the Fresnel lens is located directly before the reflecting mirror 57.

When the light emitting tube 56 emits strobe light upon the shutter releasing, the direct light and the light reflected by the second reflecting surfaces 57a are emitted from the strobe within a small illumination angle limited by the Fresnel lens 61, corresponding to the telephoto position.

In a conventional strobe device, the condenser lens comes away from the reflecting mirror in the telephoto position, so that the emission efficiency is lowered, as mentioned above. However, in a strobe according to the present invention, a high emission efficiency can be gained, resulting in a large guide number.

Furthermore, according to the present invention, the single Fresnel lens 61 is easily moved along a circular locus T between the advanced position corresponding to the telephoto position and the retracted position corresponding to the wide-angle position, to thereby switch the illumination angle in two steps in accordance with the change of the angle of view, which in turn varies in accordance with the focal length by a very simple mechanism, i.e., by merely rotating the rotary supporting member 59. Consequently, a large space for the displacement of the Fresnel lens in the optical axis direction is not necessary. Furthermore, a large Fresnel lens is not necessary in the present invention, thus resulting in the realization of a small strobe device 55.

Figure 31:
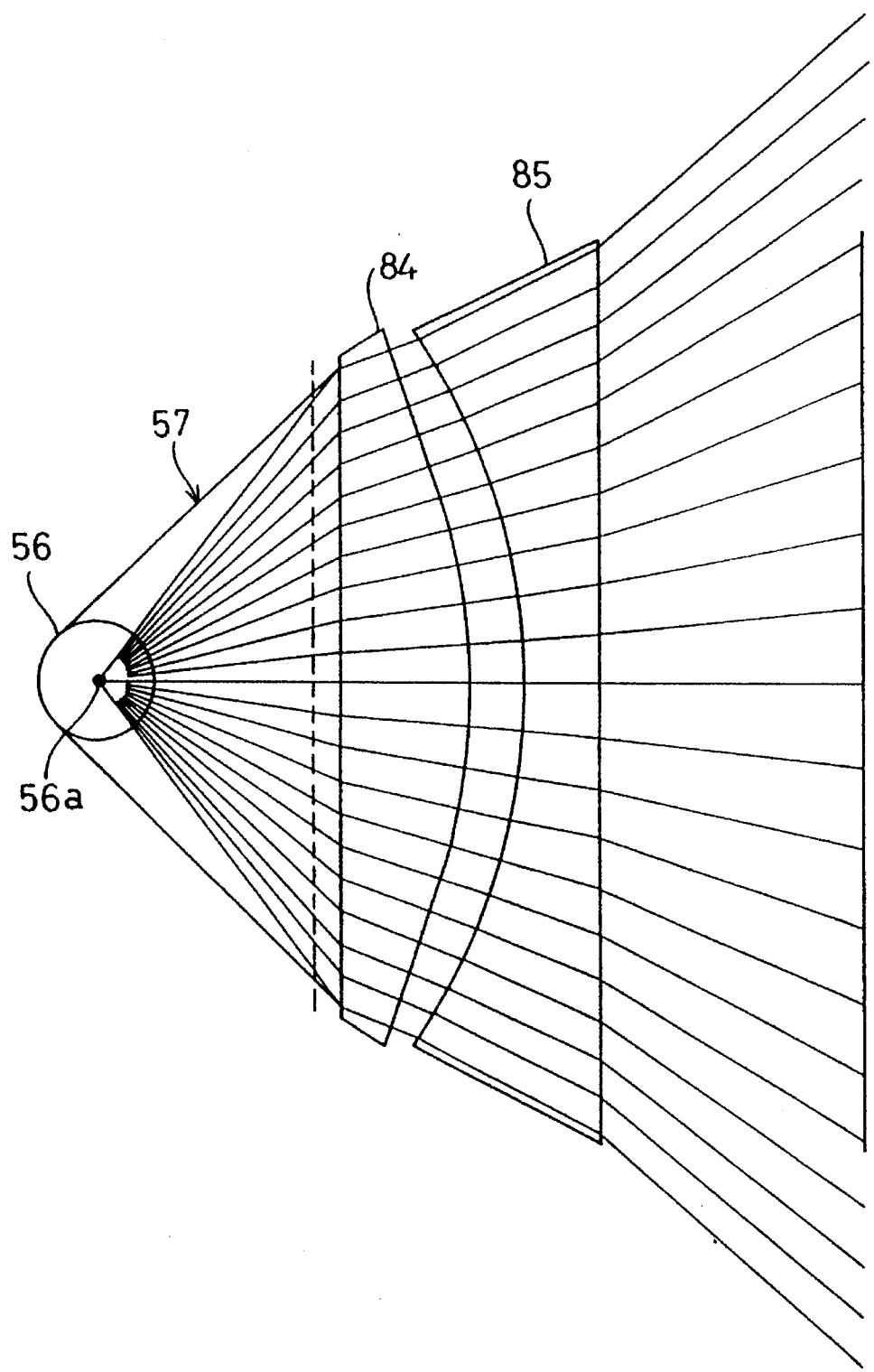
FIG. 31 is a side elevation view of a reflector incorporated in a strobe device according to a thirteenth embodiment of the present invention at a wide-angle extremity.
Figure 32:
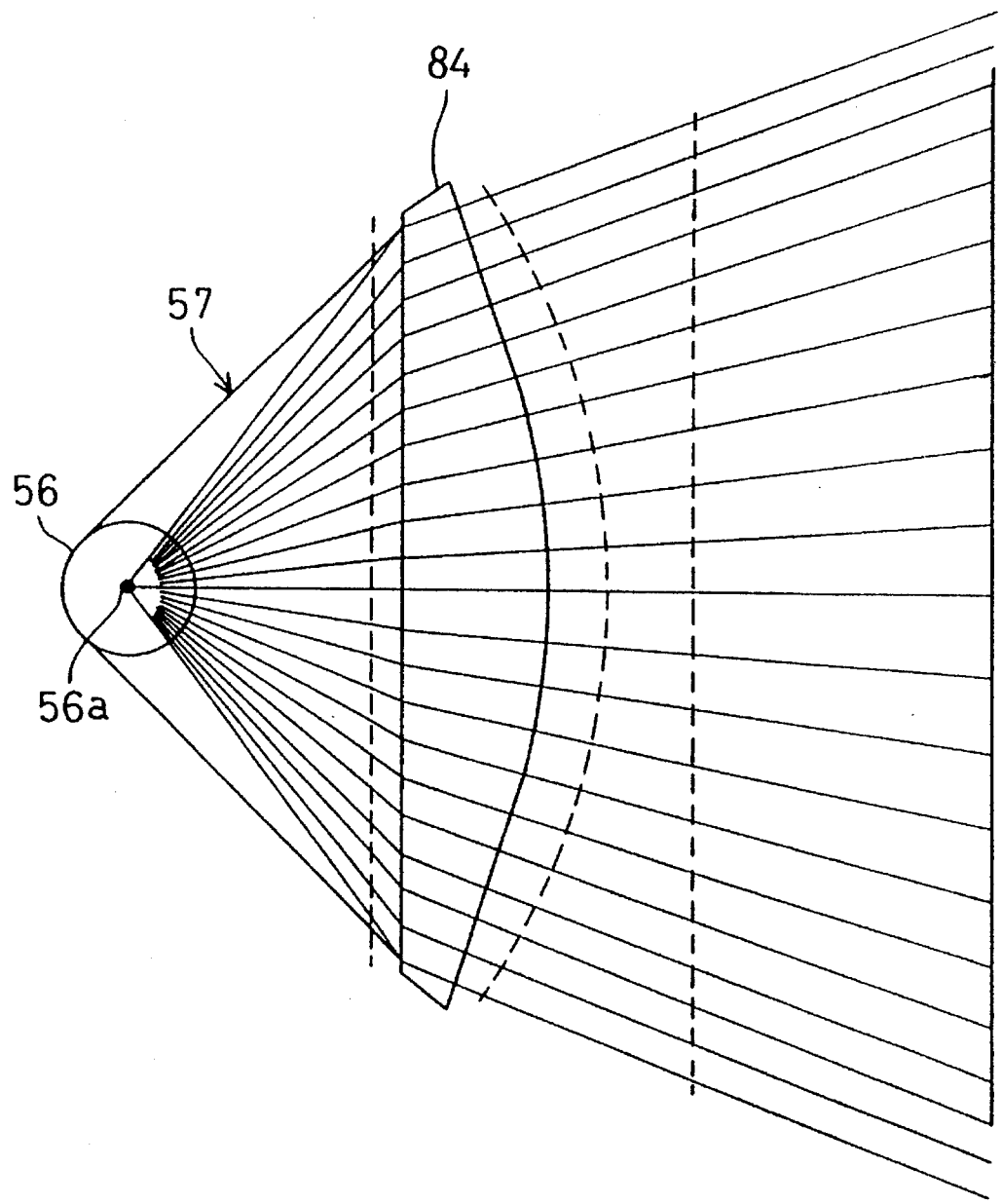
FIG. 32 is a side elevation view of a reflector incorporated in a strobe device according to a thirteenth embodiment of the present invention at a telephoto extremity.

FIGS. 31 and 32 show a thirteenth embodiment of the present invention which slightly differs from the twelfth embodiment. Substantially all of the components of the thirteenth embodiment are identical to the corresponding elements of the twelfth embodiment, except for the lens member (Fresnel lens). Accordingly, the following discussion will be addressed only to the differences therebetween. Note that there is no substantial difference in the control system shown in FIG. 26 between the twelfth and thirteenth embodiments.

In the thirteenth embodiment, the single Fresnel lens 61 of the twelfth embodiment is replaced with a lens member including a first positive lens 84 and a second negative lens 85. The first positive lens 84 is immovably located before the reflecting mirror 57 at the front end thereof. The second negative lens 85 is connected to the rotary supporting member 59 (FIG. 28) in the same fashion as the Fresnel lens 61 so as to move between the advanced position corresponding to the wide-angle position in which the second lens 85 is located directly in front of the first lens 84 and the retracted position corresponding to the telephoto position in which the second lens 85 is retracted from the first lens 84, in accordance with the focal length of the zoom lens 77. Consequently, the illumination angle can be discontinuously varied in two steps in accordance with the focal length of the zoom lens 77.

The first lens 84 has a first surface which faces the light emitting tube 56 and which is defined by a Fresnel lens surface having a radius of curvature R of 15 mm (R=15 mm) and a cone coefficient k of $-2$ (k=$-2$), so that the portion of the first lens adjacent to the front surface of the reflecting mirror 57 can be made flate. The cone coefficient k satisfies the following equation:

$$X=CY^2/[1+\{1-(1+k)C^2Y^2\}^{1/2\times}]$$

wherein X designates the distance of the apex of the aspheric surface at a point spaced from the optical axis O by a height Y from a tangential plane; and, C curvature (1/r) at the apex of the aspheric surface, respectively.

In an example, the radius of curvature R and the cone coefficient k of the second surface of the first lens 84 are R=$-8$ and k=$-5$, respectively. The radius of curvature R of the third surface of the second lens 85 that faces the light emitting tube 56 is R=$-10$, and the radius of curvature R of the fourth surface of the second lens 85 is R=$\infty$, respectively.

In the advanced position corresponding to the wide-angle position shown in FIG. 31, the second lens 85 is moved before the first lens 84 provided in front of the reflecting mirror 57. This arrangement covers the focal length range of 28 mm through 60 mm in a 35 mm camera (Leica format). The beams emitted from the light emitting tube 56 are converged by the first positive lens 84 towards the optical axis side and are then diverged by the second negative lens 85 to increase the illumination angle.

In the retracted position corresponding to the telephoto position shown in FIG. 32, the second lens 85 is retracted from the first lens 84. This arrangement covers the focal length more than 60 mm in a 35 mm camera (Leica format). The beams emitted from the light emitting tube 56 are converged by the first positive lens 84 towards the optical axis side to reduce the illumination angle.

In the thirteenth embodiment, when the zoom lens 77 is moved to the wide-angle position, the second lens 85 is moved in front of the first lens 84 by the rotary supporting member 59, which is rotated in accordance with the command signals from the CPU 67.

In this state, when the release switch 70 is turned on the flash circuit 72 causes the light emitting tube 56 to emit strobe light in response to the emission signals from the CPU 67, so that the direct light and the light reflected by the reflecting surfaces 57a are transmitted through the first and second lenses 84 and 85 and are emitted therefrom at a large illumination angle corresponding to the wide-angle position. Consequently, similar to the twelfth embodiment, the direct light and the reflected light are effectively emitted in substantially the same directions. Thus, a strobe device having an increased light utilization efficiency and guide number, and a uniform quantity distribution can be provided.

When the zoom lens 77 is moved to the telephoto position from the wide-angle position, focal length data which varies in accordance with the movement of the zoom lens 77 is read by the brushes 82, which come into slide-contact with the zoom code plate 80, and input to the CPU 67. When the focal length data becomes 60 mm, the CPU 67 outputs drive signals to the strobe motor driving circuit 73. As a result, the strobe motor 65 is reversed by the strobe motor driving circuit 73 to rotate the rotary supporting member 59 in the counterclockwise direction, so that the second lens 85 is retracted from the first lens 84.

When the release switch 70 is turned ON, the light emitting tube 56 emits strobe light, so that the direct light and the reflected light reflected by the second reflecting surfaces 57a are transmitted through the first lens 84 and emitted therefrom at a small illumination angle corresponding to the telephoto position.

In a conventional strobe device, the condenser lens comes away from the reflecting mirror in the telephoto position, so that the emission efficiency is lowered, as mentioned above. However, in a strobe according to the thirteenth embodiment of the present invention, a high emission efficiency can be gained, resulting a in large guide number, similar to the twelfth embodiment.

In the case that the strobe device is to be prepared so that two different illumination angles can be set, it is preferable to set a focal length value between the focal length values at the tele extremity and wide extremity at which the illumination angle is to be changed. In such case, the focal length would be set at around 50 mm to 60 mm. In the case that three different illumination angles can be set, it is preferable to set two equidistant focal length values between the focal length values at the tele extremity and wide extremity at which the illumination angle is to be changed.

Furthermore, according to the present invention, the second lens 85 is easily moved along a circular locus T between the advanced position corresponding to the wide-angle position and the retracted position corresponding to the telephoto position, to thereby switch the illumination angle in two steps in accordance with the change of the angle of view, which in turn varies in accordance with the focal length by a very simple mechanism, i.e., by merely rotating the rotary supporting member 59.

Although the illumination angle is switched in two steps by the movement of the (single) lens member (Fresnel lens 61 in the twelfth embodiment, or second lens 85 in the thirteenth embodiment) towards and away from the front of the reflecting mirror 57 in the twelfth and thirteenth embodiments, the number of switching steps is not limited to two and can be increased by increasing the number of lenses. For instance, it is possible to selectively switch two or three different illumination angles using two lenses in combination. In this alternative, three positions (three illumination angles) are given by the absence of the lens, presence of one lens, and presence of two lenses, in front of the reflecting mirror.

Although the movement of the Fresnel lens 61 or the second lens 85 is associated with the movement of the zoom lens 77 by the control of the CPU 67 in the twelfth and thirteenth embodiments, it is alternatively possible to provide an engaging member, such as a projection, for example, on the portion of the cam ring 78 corresponding to the focal length at which the wide-angle position and the telephoto position are to be switched, so that the engaging member which is rotated together with the cam ring 78 can be adapted to move the Fresnel lens 61 or the second lens 85 between the advanced position and the retracted position.

Furthermore, while the twelfth and thirteenth embodiments are applied to a strobe device incorporated in the camera body, but it is possible to apply the present invention to an external type strobe which can be detachably attached to the camera body.

Although the strobe device 55 is applied to a still camera in the twelfth and thirteenth embodiments, the present invention is applicable to a movie camera, such as a video camera.

As can be understood from the above discussion, according to the present invention, since provision is made of the lens member which is moved towards and away from the reflecting mirror in accordance with the focal length of the zoom lens to discontinuously vary the illumination angle, reduction of the emission efficiency does not take place, so that the guide number can be increased. This would occur in the prior art when the existing condenser lens is moved away from the reflecting mirror in the telephoto position.

Moreover, according to the present invention, it is not necessary to use a large condenser lens to effectively gather light when the existing condenser lens is moved away from the reflecting mirror. Accordingly, no large space for the movement of such a large condenser lens in the optical axis direction in accordance with the focal length of the zoom lens is necessary. Consequently, a small, compact and simple strobe device can be realized.

In addition to the foregoing, according to the present invention, since the reflecting mirror 57 is shaped so that no real image of the light emitting tube 56 is formed, and instead, virtual images thereof are formed behind the reflecting mirror, the direct light from the light emitting tube 56 and the reflected light reflected from the reflecting mirror 57 are emitted forward in the substantially same directions, thus resulting in a uniform light distribution.

In the above-mentioned embodiments, one of the most significant features resides in the reflecting mirror having the substantially straight reflecting surfaces to improve the distribution of quantity of light.

Nevertheless, the inventors of the present invention have found that the distribution of light can also be improved by non-straight upper and lower reflecting surfaces that are shaped to provide a uniform light distribution within the illumination range, particularly when the reflecting surfaces are made of movable plates, as shown in FIG. 14 corresponding to the tenth embodiment. The shape of such upper and lower reflecting surfaces may be defined by, for example, a curved shape, or a combination of curve and straight, etc.

FIGS. 34 through 37 show a fourteenth embodiment of the present invention in which the concept of the non-straight upper and lower reflecting surfaces is incorporated.

The fourteenth embodiment is aimed at a small and inexpensive strobe device having a uniform light distribution and a high emission efficiency, regardless of the telephoto state or wide-angle state.

The strobe device 86 has a variable illumination angle and includes a pair of right and left auxiliary reflecting plates 88 secured to the strobe body (not shown). The Fresnel lens 87 secured to the strobe body is located at the frontmost position (left side in FIG. 34) of the strobe device 86 in front of the auxiliary reflecting plates 88. The strobe body also includes a pair of upper and lower shafts 90 provided on opposite sides of the optical axis O in a symmetric arrangement with respect to the optical axis O, a light emitting tube 91, such as a xenon tube located on the optical axis, and a stationary reflecting plate 92 which is in close contact with the light emitting tube 91 at the rear portion thereof. The optical axis O is included in a plane passing through the longitudinal axis of the light emitting tube 91.

The stationary reflecting plate 92 includes a curved reflecting surface 92a, which is arched along the rear portion of the outer peripheral surface of the light emitting tube 91, and a pair of upper and lower straight (vertical) reflecting surfaces 92b connected to the curved reflecting surface 92a. The auxiliary reflecting plates 88 bear against the straight reflecting surfaces 92b at the rear ends 88a thereof which extend rearwardly along the curvature of the light emitting tube 91.

Movable (rotatable) reflecting plates 89 having reflecting surfaces 89c are rotatably connected to the respective shafts 90. The movable reflecting plates 89 are located on opposite sides of the optical axis O in a line-symmetry arrangement with respect to the optical axis. The movable reflecting plates 89 are slightly outwardly curved, so that when the movable reflecting plates 89 are rotated about the respective shafts 90, the rear ends 89a thereof can be moved away from and close to the light emitting tube 91 to vary the inclination angle of the reflecting surfaces 89c with respect to the optical axis O. The movable reflecting plates 89 and the stationary reflecting plate 92 constitute the reflecting mirror 100.

The movable reflecting plates 89 are provided, on the rear sides thereof opposite to the reflecting surfaces 89c, with cam pins 93 which extend parallel to the longitudinal axis of the light emitting tube 91 and in the right and left directions of the movable reflecting plates 89. The cam pins 93 project outward at the opposite ends 93a thereof from the right and left edges of the rear sides of the movable reflecting plates 89.

A pair of right and left slide cam plates 94 are slidably supported in the optical axis direction O, so that the auxiliary reflecting plates 88 are located between the slide cam plates 94. The slide cam plates 94 are interconnected by a connecting member (not shown) so as to slide together in the optical axis direction (right and left direction in FIG. 34). The slide cam plates 94 are provided with opposed cam surfaces 94a which can be engaged by the projecting ends 93a of the cam pins 93 provided on the rear sides of the slide cam plates 94.

A pair of right and left spring members 96 are provided on opposite sides of the slide cam plates 94 and have arm portions 96a which bear against the projecting ends 93a of the cam pins 93. The spring members 96 are fitted on elastic rings 95 which are in turn fitted on the opposite ends of the light emitting tube 91. The arm portions 96a of the spring members 96 extend outwards to elastically press the cam pins 93 against the associated cam surfaces 94a at the projecting ends 93a of the cam pins 93.

The slide cam plates 94 are provided with elongated holes 97 extending in the optical axis O direction, and the opposite right and left ends 91a of the light emitting tube 91 are fitted in the associated elongated holes 97, so that the slide cam plates 94 are slidable in the optical axis direction.

The operation of the strobe device 86 as constructed above is as follows.

Figure 34:
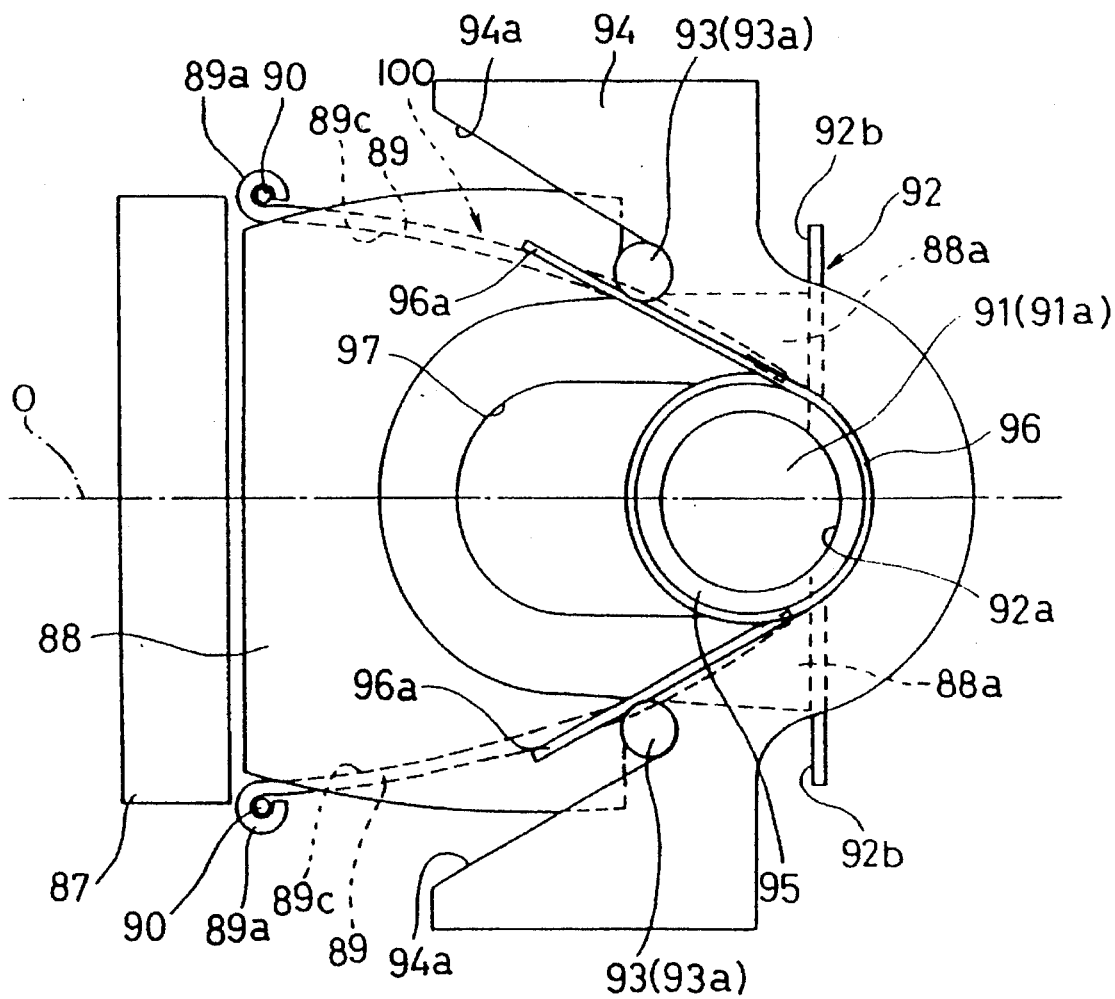
FIG. 34 is a side elevation view of a strobe device according to a fourteenth embodiment of the present invention; and, FIGS. 35, 36 and 37 are respective side elevation views of the strobe device shown in FIG. 34 at different positions.

When the slide cam plates 94 are manually moved or mechanically moved in the optical axis direction by a driving mechanism (not shown) to the frontmost position closest to the Fresnel lens 87, the movable reflecting plates 89 are rotated about the shafts 90 through the engagement of the cam pins 93 and the cam surfaces 94a, so that the rear ends 89b of the movable reflecting plates 89 come closest to the light emitting tube 91. This corresponds to the telephoto position (FIG. 34).

Figure 37:
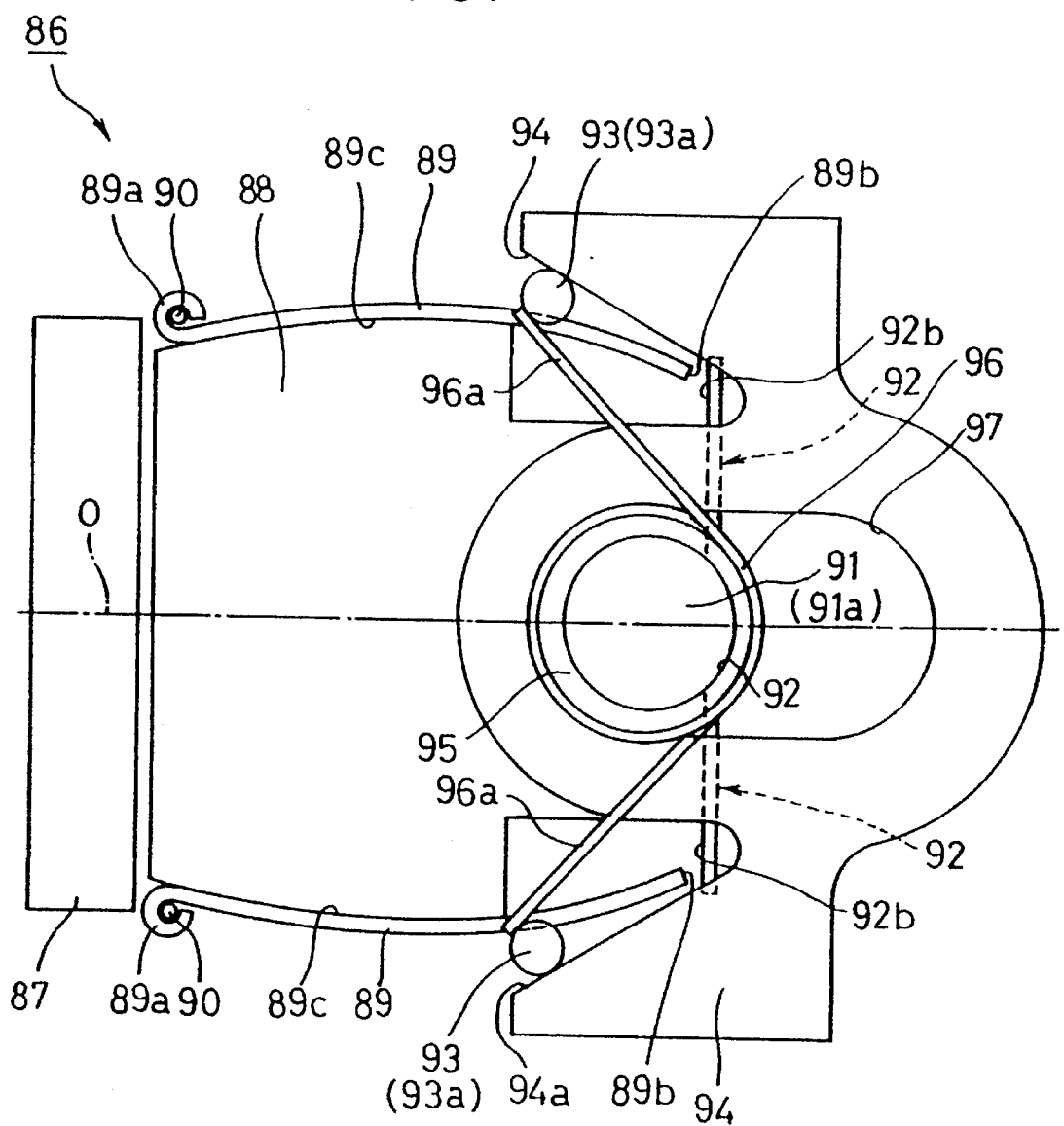

Conversely, when the slide cam plates 94 are moved in the optical axis direction to the rearmost position farthest from the Fresnel lens 87, the movable reflecting plates 89 are rotated about the respective shafts 90, so that the rear ends 89b of the movable reflecting plates 89 come farthest from the light emitting tube 91. This corresponds to the wide-angle position (FIG. 37).

Figure 35:
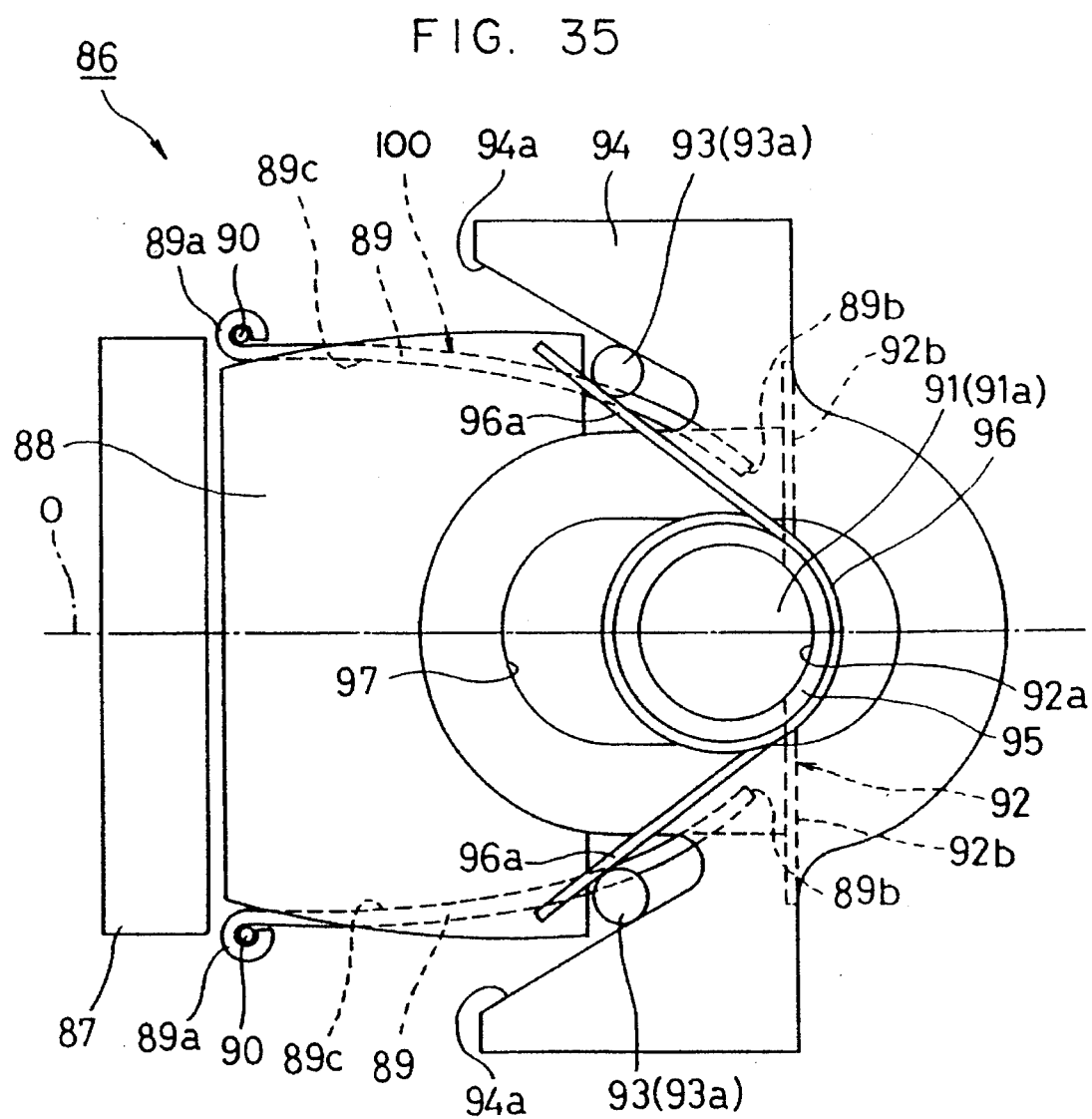
Figure 36:
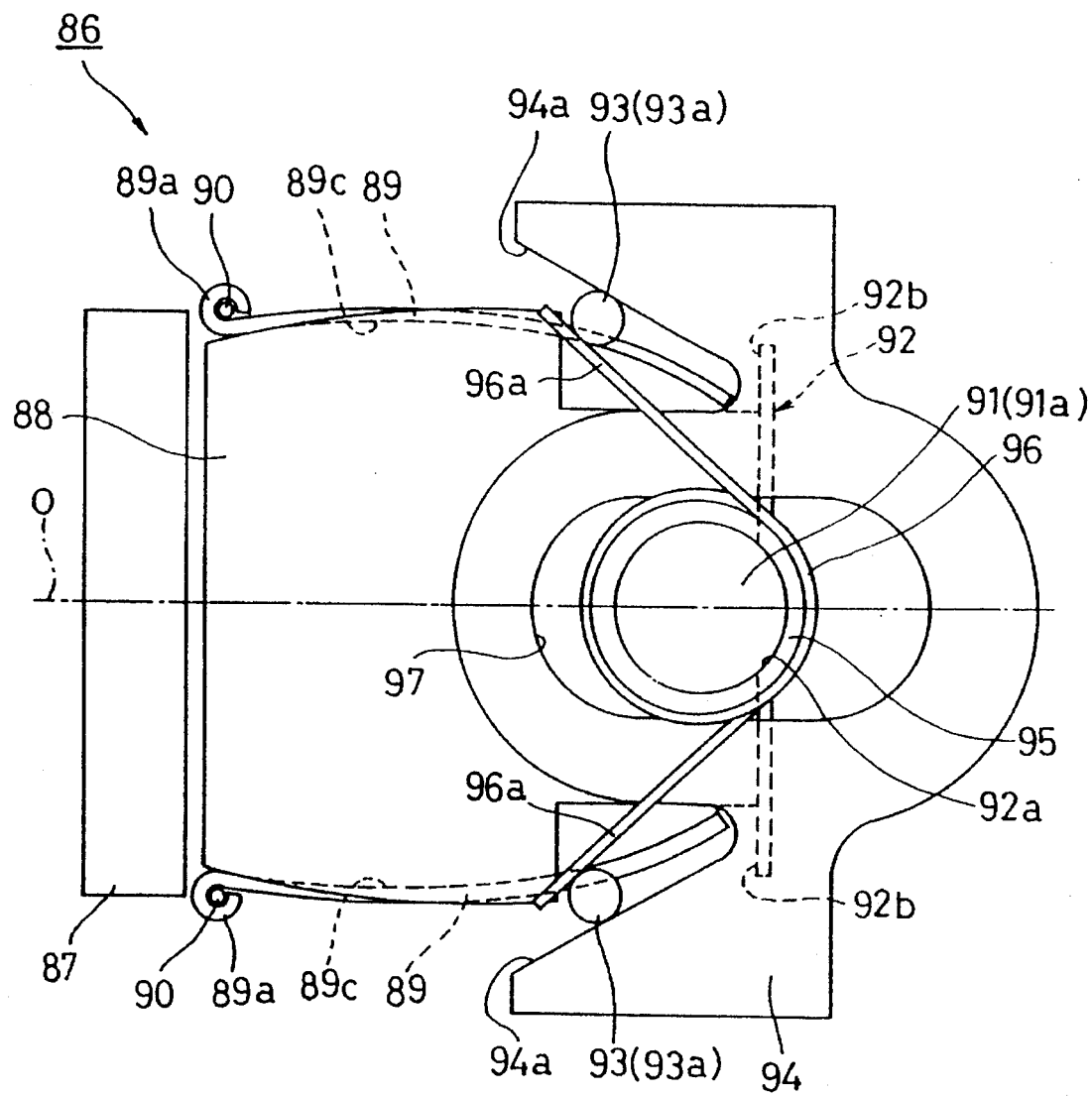

Consequently, the angle of view (illumination angle) of the strobe device 86 can be varied by the movement of the slide cam plates 94 in the optical axis direction. FIGS. 35 and 36 show intermediate positions between the telephoto position (FIG. 34) and the wide-angle position (FIG. 37). Namely, the slide cam plates 94 are moved towards the Fresnel lens in the left hand direction.

As can be seen from the above discussion, according to the present invention, the illumination angle can be manually varied or mechanically varied by a driving mechanism, as mentioned above. Alternatively, it is also possible to vary the illumination angle in association with the focal length of an associated camera to which the strobe device 86 is mounted.

The association of the strobe device 86 with the change in the focal length can be carried out by a device for transmitting the movement of the movable lens barrel of the camera to the slide cam plates 94 through a gear train or a cam mechanism. Alternatively, a device for reading the latest focal length from an existing zoom code plate provided on the movable zoom lens barrel may be provided to drive a stepping motor in accordance with the focal length data thus read and to thereby move the slide cam plates 94 accordingly.

As can be understood from the foregoing, according to the fourteenth embodiment of the present invention, since all of the light emitted from the light emitting tube can be received by the condenser lens located at the front portion of the strobe device, regardless of the telephoto state or wide-angle state, the emission efficiency can be enhanced and a uniform light distribution can be obtained.

Furthermore, since the illumination angle can be simply adjusted without a complex mechanism and the emission efficiency can be increased without a large condenser lens, a simple and inexpensive strobe device can be realized.

Although the invention has been described with reference to particular means, materials and embodiments, it is to be understood that the invention is not limited to the particulars disclosed and extends to all equivalents within the scope of the claims.

I claim:

1. A strobe device, comprising: a light source for emitting light; and a reflector which reflects light emitted from said light source, said reflector comprising reflecting surface means for forming virtual images of said light source behind said reflector;

said light source comprising a light emitting tube;

said reflecting surface means comprising a substantially arch-shaped first reflecting portion provided on at least one of an outer and inner surface of said light emitting tube and substantially planar second reflecting portions which are connected at one end to said first reflecting portion and defined by tangential planes of a circle defined by the outer surface of said light emitting tube; and wherein the following relationship exists:

$$\sin(A) \approx \{r + \{r^2 + 8e^2\}^{1/2}\}/4e$$

$$e \approx d \cdot \tan(A)$$

wherein e designates a half value of a length of an opening defined by another end of said second reflecting portions; r designates a radius of the light emitting tube; d designates a distance between a center of the light emitting tube and the opening along an optical axis of the strobe device; and, A designates an angle between one of the second reflecting portions and a line normal to the optical axis.

2. A strobe device according to claim 1, wherein said light emitting tube is substantially circular in shape.

3. A strobe device according to claim 1, further comprising a condenser lens provided on a front portion of the strobe device.

4. A strobe device according to claim 3, wherein said condenser lens is attached to said other ends of said second reflecting portions that define said opening.

5. A strobe device according to claim 4, wherein said condenser lens is a Fresnel lens.

6. A strobe device according to claim 1, further comprising a lens provided on a front portion of the strobe device to modify an illumination angle of light emitted therefrom.

7. A strobe device according to claim 1, wherein said second reflecting portions are symmetrically located on opposite sides of an optical axis of the strobe device.

8. A strobe reflecting mirror for reflecting light emitted from a light source of a strobe, said light source comprising a light emitting tube, said reflecting mirror comprising:

a first reflecting portion, provided in the vicinity of said light source, which is shaped to cover at least a portion of said light source and to form a real image of said light source at a light emitting point of said light source; and, second reflecting portions which are connected to said first reflecting portion and positioned in such a manner that a virtual image of said light source is formed behind said second reflecting portions;

wherein the following relationship exists:

$$\sin(A) \approx \{r + (r^2 + 8e^2)^{1/2}\}/4e$$

$$e \approx d \cdot \tan(A)$$

wherein e designates a half value of a length of an opening defined by said second reflecting portions; r designates a radius of the light emitting tube; d designates a distance between a center of the light emitting tube and the opening along an optical axis of the strobe; and, A designates an angle between one of the second reflecting portions and a line normal to the optical axis.

* * * * *